United States Patent
Itou et al.

(10) Patent No.: US 11,992,018 B2
(45) Date of Patent: May 28, 2024

(54) FOOD MATERIAL PROCESSING MECHANISM, FOOD MATERIAL PROCESSING METHOD, FOOD MANUFACTURING METHOD, AND FOOD MANUFACTURING SYSTEM

(71) Applicant: NICHIREI FOODS INC., Tokyo-to (JP)

(72) Inventors: Ryuichi Itou, Chiba (JP); Suguru Hirayama, Chiba (JP); Toru Iwasa, Chiba (JP); Minoru Mamiya, Chiba (JP)

(73) Assignee: NICHIREI FOODS INC., Tokyo-to (JP)

( * ) Notice: Subject to any disclaimer, the term of this patent is extended or adjusted under 35 U.S.C. 154(b) by 513 days.

(21) Appl. No.: 17/272,047

(22) PCT Filed: Aug. 26, 2019

(86) PCT No.: PCT/JP2019/033381
§ 371 (c)(1),
(2) Date: Feb. 26, 2021

(87) PCT Pub. No.: WO2020/045370
PCT Pub. Date: Mar. 5, 2020

(65) Prior Publication Data
US 2021/0345624 A1 Nov. 11, 2021

(30) Foreign Application Priority Data

Aug. 31, 2018 (JP) .................................. 2018-163922

(51) Int. Cl.
*A21C 9/06* (2006.01)
*A21D 13/31* (2017.01)
*A23P 20/20* (2016.01)

(52) U.S. Cl.
CPC .............. *A21C 9/063* (2013.01); *A21D 13/31* (2017.01); *A23P 20/20* (2016.08)

(58) Field of Classification Search
CPC ........ A21C 9/063; A21C 9/088; A21D 13/31; A23L 35/00; A23L 5/00; A23P 20/20
(Continued)

(56) References Cited

U.S. PATENT DOCUMENTS 4,073,953 A * 2/1978 Trostmann ............. A21D 13/30
426/549
4,313,719 A 2/1982 Lundgren
(Continued)

FOREIGN PATENT DOCUMENTS

CN 1496684 A 5/2004
CN 203851707 U 10/2014
(Continued)

OTHER PUBLICATIONS

International Preliminary Report on Patentability and English translation of the Written Opinion of the International Searching Authority, dated Mar. 11, 2021, for International Application No. PCT/JP2019/033381.
(Continued)

*Primary Examiner* — Dana Ross
*Assistant Examiner* — Joseph W Iskra
(74) *Attorney, Agent, or Firm* — Birch, Stewart, Kolasch & Birch, LLP

(57) ABSTRACT

A food material processing mechanism, a food material processing method and a food manufacturing method which enable highly accurate bending of a sheet-shaped flexible food material such as a skin are provided. A food material processing mechanism includes a conveyance unit and a processing unit. A conveyance unit conveys a sheet-shaped flexible food material in a conveyance direction. A process-
(Continued)

ing unit forms a bending reference portion being a reference portion for bending, in the flexible food material being conveyed by the conveyance unit. The processing unit includes a reference formation unit and a pressing unit. The reference formation unit locally applies a force to the flexible food material to form the bending reference portion. The pressing unit presses the flexible food material against the conveyance unit at least temporarily while the reference formation unit forms the bending reference portion in the flexible food material.

10 Claims, 26 Drawing Sheets

(58) Field of Classification Search
USPC ........................................................ 99/450.6
See application file for complete search history.

(56) References Cited

U.S. PATENT DOCUMENTS

| | | | |
|---|---|---|---|
| 4,516,487 A * | 5/1985 | Madison | ................ A21C 9/063 |
| | | | 99/450.2 |
| 4,638,729 A | 1/1987 | Woodworth et al. | |
| 4,913,043 A | 4/1990 | Cheung | |
| 6,170,391 B1 * | 1/2001 | Pomara, Jr. | ............ A21C 9/063 |
| | | | 99/450.2 |
| 8,505,445 B2 | 8/2013 | Robert | |
| 2021/0345624 A1 * | 11/2021 | Itou | .......................... A23P 20/20 |

FOREIGN PATENT DOCUMENTS

| | | | |
|---|---|---|---|
| CN | 107361095 A | | 11/2017 |
| JP | 50-157578 A | | 12/1975 |
| JP | 62-181729 | * | 8/1987 |
| JP | 62-181729 A | | 8/1987 |
| JP | 7-5376 U | | 1/1995 |
| JP | 2006-101719 A | | 4/2006 |

OTHER PUBLICATIONS

International Search Report (PCT/ISA/210) issued in PCT/JP2019/033381 dated Nov. 12, 2019.
Written Opinion (PCT/ISA/237) issued in PCT/JP2019/033381 dated Nov. 12, 2019.
International Preliminary Report on Patentability and English translation of the Written Opinion of the International Searching Authority, dated Mar. 11, 2021, for International Application No. PCT/JP2019/033380.
International Serch Report for International Application No. PCT/JP2019/033380, dated Nov. 12, 2019, with an English translation.

* cited by examiner

FOOD MATERIAL PROCESSING MECHANISM, FOOD MATERIAL PROCESSING METHOD, FOOD MANUFACTURING METHOD, AND FOOD MANUFACTURING SYSTEM

TECHNICAL FIELD

The present invention relates to a food material processing mechanism and a food material processing method which form a bending reference portion in a sheet-shaped flexible food material, and to a food manufacturing system and a food manufacturing method which use a sheet-shaped flexible food material in which a bending reference portion is formed.

BACKGROUND ART

Various processed foods are widely provided not only to general consumers but also to stores. Processed foods can be provided in various forms, such as room temperature foods, refrigerated foods, chilled foods and frozen foods, by the development of food processing technology (in particular, the development of refrigeration technology and freezing technology). Demands for such processed foods are expected to increase further in the future as consumers' tastes diversify, needs for convenience increase, and awareness of food safety increases. In particular, it is desired to provide not only processed foods that are easy to process but also processed foods that are complicated and difficult to process.

Examples of such processed foods include rolled foods such as a spring roll and an egg roll. In order to make a rolled food, it is necessary to wrap an ingredient with a skin made of wheat flour or the like. Proper skill and experience are necessary for neatly and appropriately wrapping an ingredient with a skin, and such work is very difficult for those who are not accustomed to cooking and is often avoided. In addition, it is difficult even for a person who is accustomed to cooking to make a large amount of rolled foods with uniform quality, and it is a burdensome work that requires time and labor. Therefore, processors make large quantities of rolled foods using a food manufacturing apparatus that is able to automatically manufacture such rolled foods.

For example, Patent Literature 1 discloses a method and an apparatus for automatically entraining an ingredient in a skin material. In the apparatus disclosed in Patent Literature 1, the skin material is lifted and bent by rocking of a swinging pestle and is put on an ingredient. When an ingredient is wrapped with a skin by the apparatus in this way, the skin which is positively bent by a member is placed on the ingredient. This process of covering an ingredient with a skin is performed in a similar manner also when the ingredient is further covered with a portion of the skin located on a side of the ingredient in a state where the ingredient is wrapped in the skin.

Further, Patent Literature 2 discloses an apparatus which folds a pastry dough a plurality of times in such a manner that a food (a spring roll, tacos, etc.) in which an ingredient is wrapped by a pastry dough is manufactured.

Further, Patent Literature 3 discloses a manufacturing apparatus for a rolled food which uses a plurality of rollers to wrap an ingredient with an outer skin.

CITATION LIST

Citation List

Patent Literature

Patent Literature 1: Japanese patent application publication No. 50-157578
Patent Literature 2: U.S. Pat. No. 8,505,445
Patent Literature 3: Japanese patent application publication No. 2006-101719

SUMMARY OF INVENTION

Technical Problem

While food manufacturing apparatuses which are capable of automatically wrapping an ingredient with a skin, such as the apparatuses in Patent Literatures 1 and 2 described above, are already known, it is desired to further improve such apparatuses and methods.

Specifically, an apparatus and a method which are capable of manufacturing a large amount of rolled foods with more uniform and higher quality are desired. For example, if folded parts of skins vary between the skins when ingredients are wrapped with the skins, not only the aesthetic appearance of the rolled foods is spoiled, but also the deliciousness such as texture is adversely affected, and therefore, there is also a concern that predetermined standards are not met and thus the value as a product is completely impaired.

In addition, processing speed is also important in order to manufacture as many rolled foods as possible during a limited time. In particular, while delicate handling is required when an ingredient is wrapped with a flexible and breakable skin, it is not easy to perform such delicate handling at high speed and reliably. Further, in a production system where other works are continuously performed before and after the work of wrapping an ingredient with a skin, such as a production system for spring rolls, there is also a concern that the work of wrapping an ingredient with a skin becomes a bottleneck, so that the improvement of the productivity of the entire system is hindered.

In the apparatus in Patent Literature 2, a crease is formed in a pastry dough by moving a plate (that is, a flanging plate) up and down, and therefore, a drive mechanism and a power source for driving the plate are required. Further, in the apparatus in Patent Literature 2, in order to form a crease in a pastry dough, it is necessary to move the plate up and down in a state where the pastry dough is situated in a predetermined position. In cases where a plate is moved plate up and down while a pastry dough is being moved, a mechanism which monitors the position of the pastry dough is required, and the position of a crease actually formed is likely to shift. On the other hand, in cases where a plate is moved up and down in a state where a pastry dough is stopped at a predetermined position, a crease can be formed in the pastry dough with high accuracy. However, in this case, it is necessary to stop a pastry dough intermittently, and thus it is difficult to perform high-speed processing and it is not preferable in terms of productivity.

Further, according to the manufacturing apparatus disclosed in Patent Literature 3, the left and right end portions of an outer skin are raised and are folded inward by left and right annular belts respectively, but it is difficult for this manufacturing apparatus to accurately and stably fold the left and right end portions of an outer skin. It is very important to fold outer skins at a predetermined position with high accuracy in order to stably manufacture a large amount of final products (foods) which have a desired texture and a desired taste and also have an excellent aesthetic appearance. However, in the apparatus in Patent Literature 3, there are concerns that the folding positions of the left and right end portions of outer skins are not stable, so that the folding positions vary among a plurality of outer skins which are continuously processed in the apparatus and the left and right end portions of each outer skin are not folded in a symmetric fashion.

The present invention has been contrived in view of the above circumstances, and an object of the present invention is to provide a food material processing mechanism, a food material processing method and a food manufacturing method which enable highly accurate bending of a sheet-shaped flexible food material such as a skin. Further, an object of the present invention is to provide a food material processing mechanism, a food material processing method and a food manufacturing method which simultaneously perform the formation of a bending reference portion in a sheet-shaped flexible food material and the local deformation of the flexible food material to seek to speed up processing. In addition, an object of the present invention is to provide a food material processing mechanism, a food material processing method and a food manufacturing method which can improve the productivity of a food.

Solution to Problem

One aspect of the present invention is directed to a food material processing mechanism comprising: a conveyance unit which conveys a sheet-shaped flexible food material in a conveyance direction; and a processing unit which forms a bending reference portion being a reference portion for bending, in the flexible food material being conveyed by the conveyance unit, wherein the processing unit includes: a reference formation unit which locally applies a force to the flexible food material to form the bending reference portion; and a pressing unit which presses the flexible food material against the conveyance unit at least temporarily while the reference formation unit forms the bending reference portion in the flexible food material.

The reference formation unit may be smaller than the pressing unit with respect to a width direction perpendicular to the conveyance direction.

The conveyance unit may include a conveyance body on which the flexible food material is placed and which travels in the conveyance direction, the reference formation unit includes a reference pressing unit by which the flexible food material being conveyed in the conveyance direction is pinched jointly with the conveyance body, and the pressing unit may press the flexible food material against the conveyance unit to deform the flexible food material.

A maximum value of a pressure applied to the flexible food material by the reference formation unit may be larger than a maximum value of a pressure applied to the flexible food material by the pressing unit.

The reference formation unit may locally apply a force to two or more parts of the flexible food material which are separated from each other in a width direction perpendicular to the conveyance direction.

At least one of the reference formation unit and the pressing unit may include a roller which rotates while the roller is in contact with the flexible food material being conveyed by the conveyance unit.

The reference formation unit may include a reference roller which rotates while the reference roller is in contact with the flexible food material being conveyed by the conveyance unit, the pressing unit may include a pressing roller which rotates while the pressing roller is in contact with the flexible food material being conveyed by the conveyance unit, and a center axis of rotation of the reference roller and a center axis of rotation of the pressing roller may be arranged on a same straight line.

A diameter of the reference roller may be larger than a diameter of the pressing roller.

The plurality of pressing rollers may be provided and at least two or more of the plurality of pressing rollers may be arranged at positions where the at least two or more of the plurality of pressing rollers are separated from each other in a width direction perpendicular to the conveyance direction.

The plurality of pressing rollers may include a first pressing roller and a second pressing roller which are arranged at positions where the first pressing roller and the second pressing roller are separated from each other in the width direction, and the plurality of the reference rollers may be provided, the plurality of reference rollers may include a first reference roller and a second reference roller, and the first reference roller and the second reference roller may be arranged at positions where the first reference roller and the second reference roller separated from each other in the width direction and are provided between the first pressing roller and the second pressing roller.

The plurality of pressing rollers may include a third pressing roller arranged between the first reference roller and the second reference roller in the width direction.

Another aspect of the present invention is directed to a food manufacturing system comprising: a food material processing mechanism described above; and a bending mechanism which bends a sheet-shaped flexible food material in which a bending reference portion has been formed by the food material processing mechanism, with reference to the bending reference portion.

Another aspect of the present invention is directed to a food material processing method comprising the step of conveying a sheet-shaped flexible food material in a conveyance direction by a conveyance unit, wherein a reference formation unit locally applies a force to the flexible food material being conveyed by the conveyance unit to form a bending reference portion being a reference portion for bending, and wherein a pressing unit which presses the flexible food material against the conveyance unit at least temporarily while the bending reference portion is formed in the flexible food material.

Another aspect of the present invention is directed to a food manufacturing method using a sheet-shaped flexible food material in which a bending reference portion has been formed by a food material processing method described above.

Advantageous Effects of Invention

According to the present invention, it is possible to bend a sheet-shaped flexible food material, such as a skin, with high accuracy. Further, the present invention makes it possible to simultaneously perform the formation of a bending reference portion in a sheet-shaped flexible food material and the local deformation of the flexible food material to seek to speed up processing. In addition, the present invention makes it possible to improve the productivity of a food.

DESCRIPTION OF EMBODIMENTS

Hereinafter, typical embodiments of the present invention will be described as examples with reference to the drawings. For convenience of illustration and understanding, the size and the scale of the elements shown in each drawing do not necessarily correspond to a real thing and do not necessarily correspond to each other between the drawings. However, those skilled in the art could clearly understand the configurations, the actions and the effects of the elements shown in each of the drawings, in light of the descriptions of the present specification and the claims.

In the following embodiments, a system which manufactures spring rolls is described as an example, and a skin for a spring roll is used as a "sheet-shaped flexible food material". The present invention is not limited to the following embodiments, and the present invention may be applied to foods other than spring rolls. Typically, the present invention can be suitably applied to rolled foods in which an ingredient is wrapped with a skin. However, the present invention can also be applied to apparatuses and methods which manufacture other foods, and for example, it is also possible to apply the present invention to an apparatus which manufactures a food (such as an egg roll) which is constituted by a skin only without arranging an ingredient inside of the food.

[One Example of a Method of Manufacturing a Spring Roll]

FIGS. 1A to 1F are diagrams for explaining an example of a method of manufacturing a spring roll (in particular, a technique for folding a skin). FIG. 2 is a flowchart of the method of manufacturing a spring roll illustrated in FIGS. 1A to 1F.

Figure 1A:
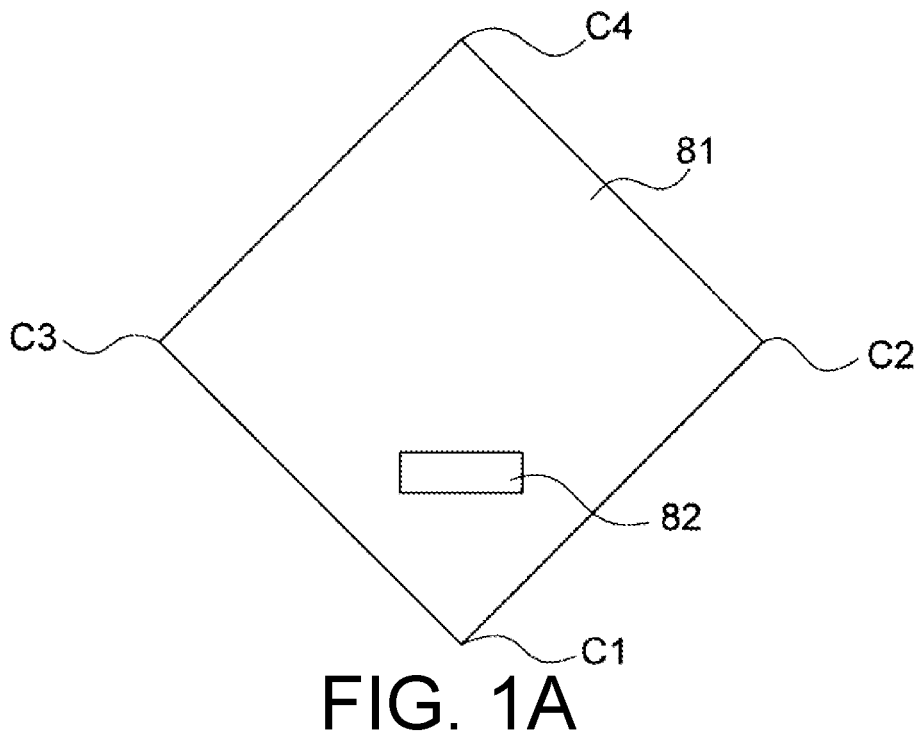
FIG. 1A is a diagram for explaining an example of a method of manufacturing a spring roll (in particular, a technique for folding a skin).
Figure 2:
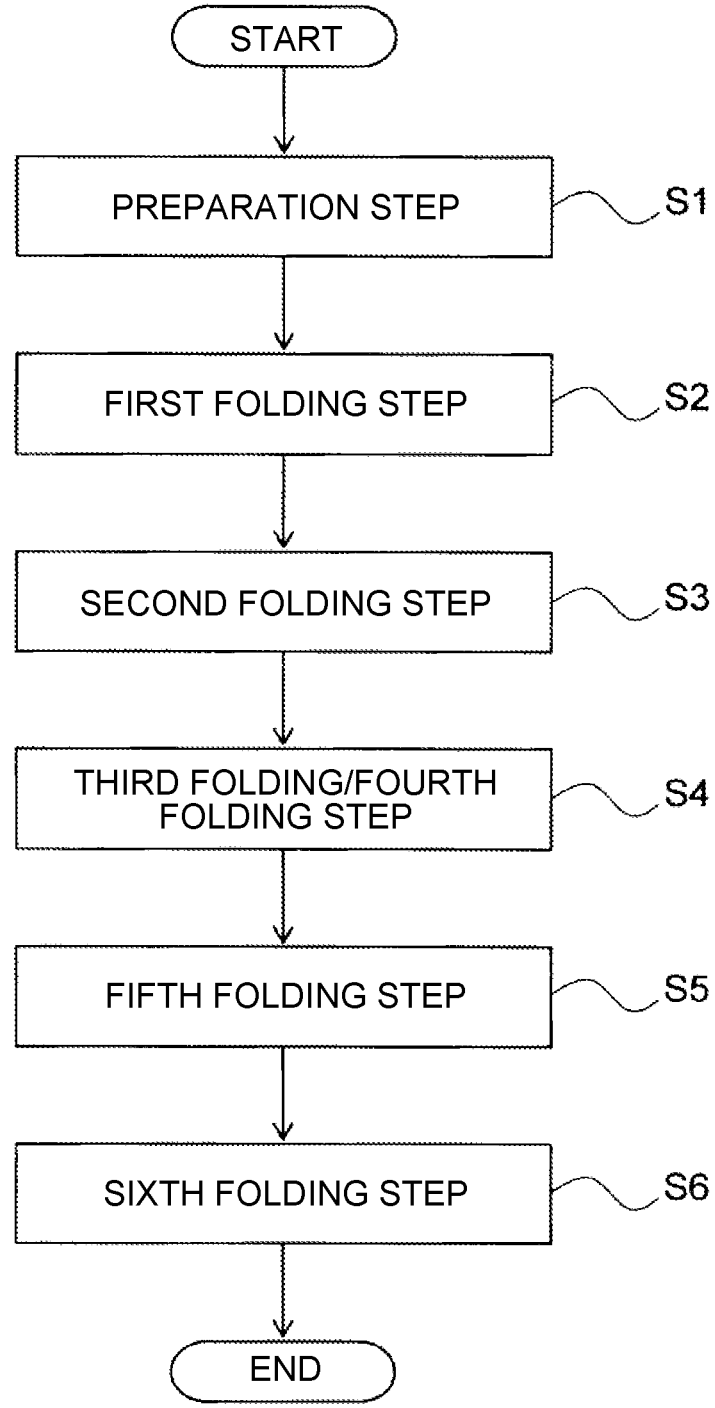
FIG. 2 is a flowchart of the method of manufacturing a spring roll illustrated in FIGS. 1A to 1F.

First, an ingredient 82 is placed on a skin 81 which has been spread as indicated in FIG. 1A (a preparation step S1). In the present example, the ingredient 82 is placed on one of the two isosceles triangles (i.e., the lower triangle in FIG. 1A) included in the quadrangular (in particular, square) skin 81.

Figure 1B:
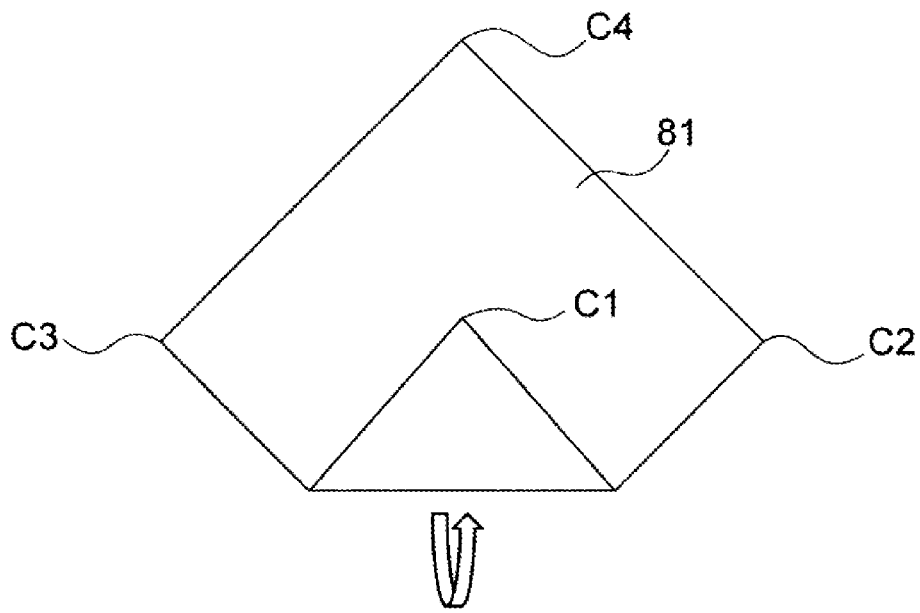
FIG. 1B is a diagram for explaining an example of a method of manufacturing a spring roll (in particular, a technique for folding a skin).

Then, as illustrated in FIG. 1B, a part of the skin 81 is folded back, so that the ingredient 82 is covered and wrapped with the skin 81 (a first folding step S2). In the present example, one of the four vertices of the skin 81 (i.e., the lower vertex in FIG. 1B; hereinafter also referred to as a "first vertex C1") is folded back toward the opposite vertex.

Figure 1C:
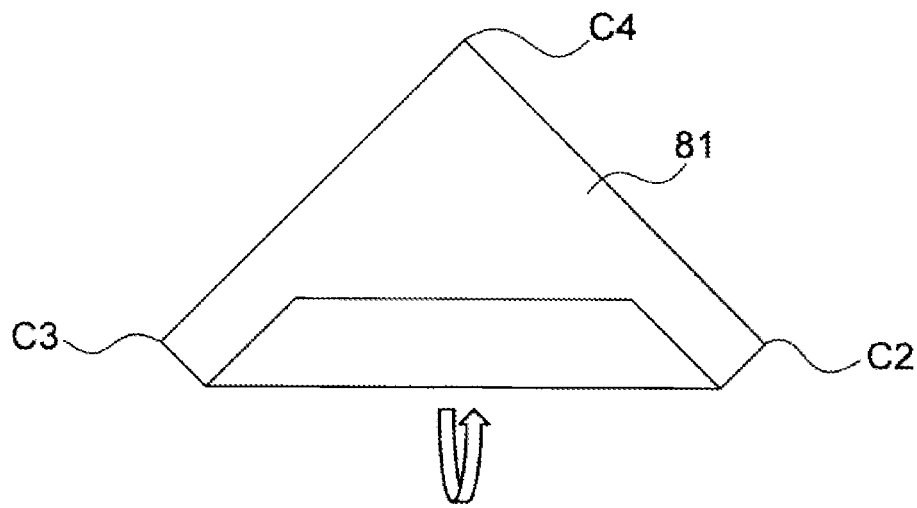
FIG. 1C is a diagram for explaining an example of a method of manufacturing a spring roll (in particular, a technique for folding a skin).

Then, the skin 81 is further folded back as illustrated in FIG. 1C, so that the ingredient 82 is wrapped by the skin 81 (a second folding step S3). In the present example, the skin 81 is folded back in such a manner that all or part of the portion of the skin 81 positioned above the ingredient 82 immediately after the first folding step S2 is arranged below the ingredient 82.

Figure 1D:
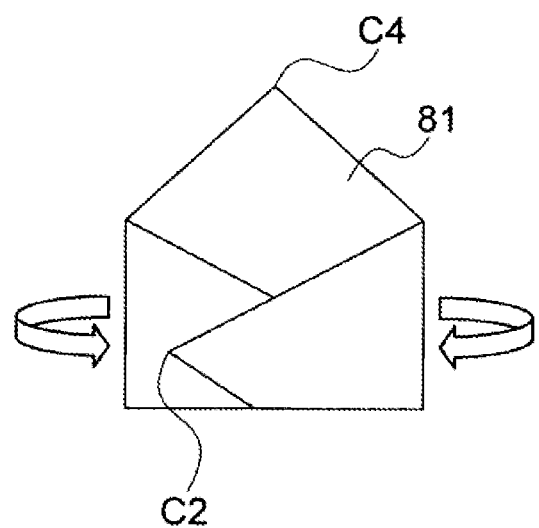
FIG. 1D is a diagram for explaining an example of a method of manufacturing a spring roll (in particular, a technique for folding a skin).

Then, the left and right portions of the skin 81 are folded back as illustrated in FIG. 1D, so that the ingredient 82 is covered also by these left and right portions of the skin 81 (a third folding/fourth folding step (a skin bending step) S4). In the present example, two vertices (i.e., the left and right vertices in FIG. 1D; hereinafter, also referred to as a "second vertex C2" and a "third vertex C3") arranged adjacent to the first vertex C1, included in the folded portion in the first folding step S2 and the second folding step S3, are moved in such a manner that the skin 81 is folded in the directions perpendicular to the bending direction of the skin 81 in the first folding step S2 and the second folding step S3.

Figure 1E:
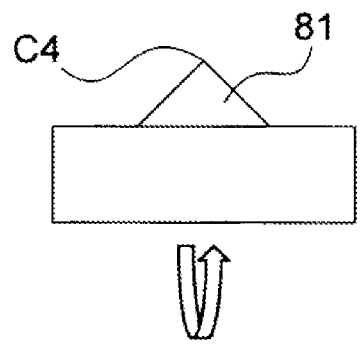
FIG. 1E is a diagram for explaining an example of a method of manufacturing a spring roll (in particular, a technique for folding a skin).

Then, the ingredient 82 is further rolled toward the remaining vertex (i.e., the upper vertex in FIG. 1D; hereinafter also referred to as a "fourth vertex C4") along with the portion of the skin 81 covering the ingredient 82 as illustrated in FIG. 1E, so that the ingredient 82 is further wrapped with the skin 81 (a fifth folding step S5). In this situation, a portion of the skin 81 including the fourth vertex C4 is located outside the ingredient 82.

Figure 1F:
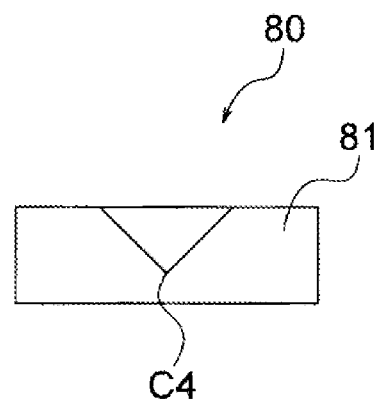
FIG. 1F is a diagram for explaining an example of a method of manufacturing a spring roll (in particular, a technique for folding a skin).

Then, the portion of the skin 81 including the fourth vertex C4 is folded back so as to cover the ingredient 82 as illustrated in FIG. 1F (a sixth folding step S6). In this situation, the portion of the skin 81 including the fourth vertex C4 may be attached to the portion of the skin 81 which has already covered the ingredient 82. For attaching portions of the skin 81 to each other, a liquid which contains a binder component, such as wheat flour, or a liquid (water or the like) which does not contain such a binder component may be used as glue.

By carrying out the series of the above-mentioned steps (i.e., the preparation step S1 to the sixth folding step S6), a spring roll 80 having a rectangular planar shape can be produced (see FIG. 1F). As described above, in order to produce a spring roll 80, a skin 81 is bent in each step (in particular, the first folding step S2 to the sixth folding step S6). In order to finally obtain a spring roll 80 which has an excellent aesthetic appearance, it is important to properly fold a skin 81 in each step. In particular, in the third folding/fourth folding step S4, it is difficult to fold a skin 81 with high quality and uniformly because the skin 81 is folded in directions different from the rolling direction of an ingredient 82 (that is, the vertical direction in FIGS. 1A to 1F) in a state where a plurality of layers of the skin 81 are stacked.

Figure 3:
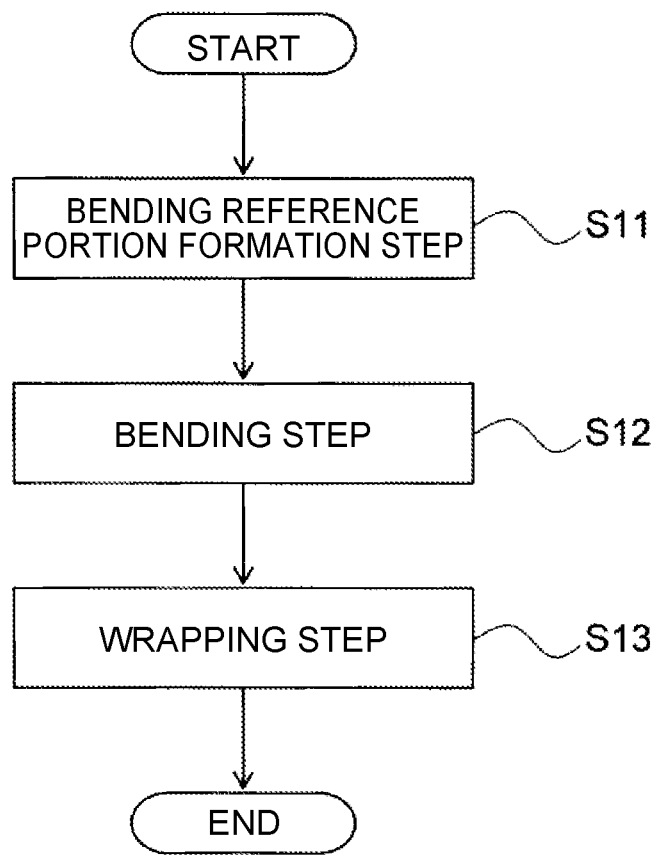
FIG. 3 is a flowchart showing an example of a step for third folding and fourth folding.
Figure 4:
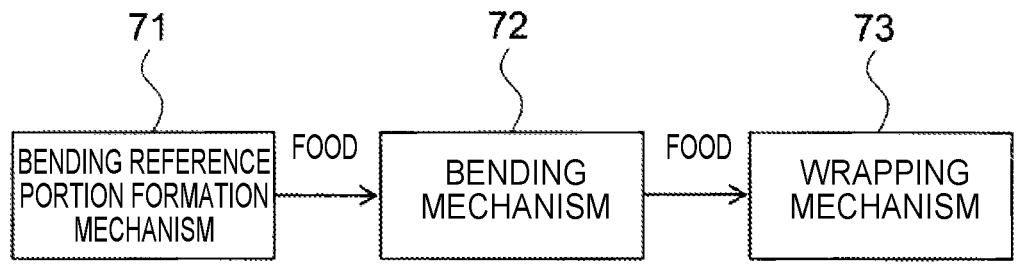
FIG. 4 is a block diagram of mechanisms which carry out the third folding/fourth folding step illustrated in FIG. 3.

Therefore, the third folding/fourth folding step S4 in the present embodiment is carried out as illustrated in FIGS. 3 and 4.

FIG. 3 is a flowchart showing an example of the third folding/fourth folding step S4. FIG. 4 is a block diagram of mechanisms which carry out the third folding/fourth folding step S4 illustrated in FIG. 3.

The third folding/fourth folding step S4 of the present embodiment includes a bending reference portion formation step S11, a bending step S12 and a wrapping step S13.

In the bending reference portion formation step S11, reference portions for the folding performed in the third folding/fourth folding step S4 (hereinafter, also referred to as "bending reference portions") are formed in a skin 81 by a bending reference portion formation mechanism (a food material processing mechanism) 71. The specific aspects of the bending reference portions are not limited in particular, and typically, the bending reference portions may be configured by creases. The formation of such a bending reference portion may be performed in a state where an ingredient 82 is placed on a skin 81 or may be performed in a state where an ingredient 82 is not placed on a skin 81.

The bending reference portion formation mechanism 71 described below locally applies pressure to a skin 81 to form a crease, and a bending reference portion is formed by a part of the skin 81 which has been locally pressed.

In the bending step S12, a skin 81 is bent, with reference to the bending reference portions, by a bending mechanism 72. Then, in the wrapping step S13, raised portions of a skin 81 are placed on an ingredient 82 by a wrapping mechanism 73. The bending mechanism 72 and the wrapping mechanism 73 may be configured by a common mechanism or may be configured by different mechanisms from each other.

As described above, the bending reference portion formation mechanism 71 of the present embodiment carries out the bending reference portion formation step S11 of the third folding/fourth folding step S4. Below, a specific configuration example of the bending reference portion formation mechanism 71 will be described. In the present embodiment, an apparatus (including a mechanism) and a method according to the present invention are applied to the third folding/fourth folding step S4, but an apparatus (including a mechanism) and a method according to the present invention may be applied to another step involving bending of a skin 81 (for example, the first folding step S2, the second folding step S3, the fifth folding step S5, and the sixth folding step S6).

[Bending Reference Portion Formation Mechanism]

Figure 5:
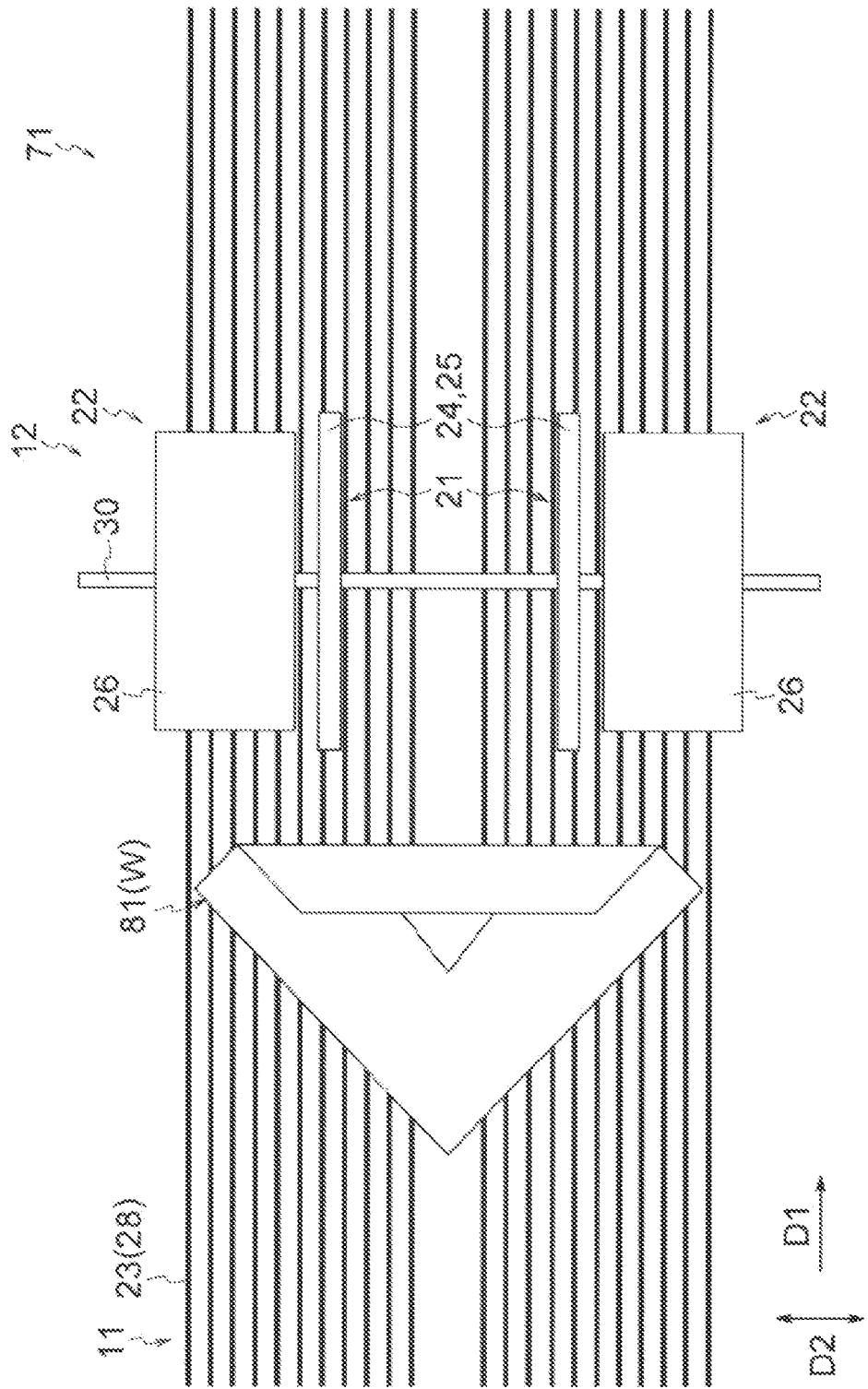
FIG. 5 is a plan view of a bending reference portion formation mechanism.
Figure 6:
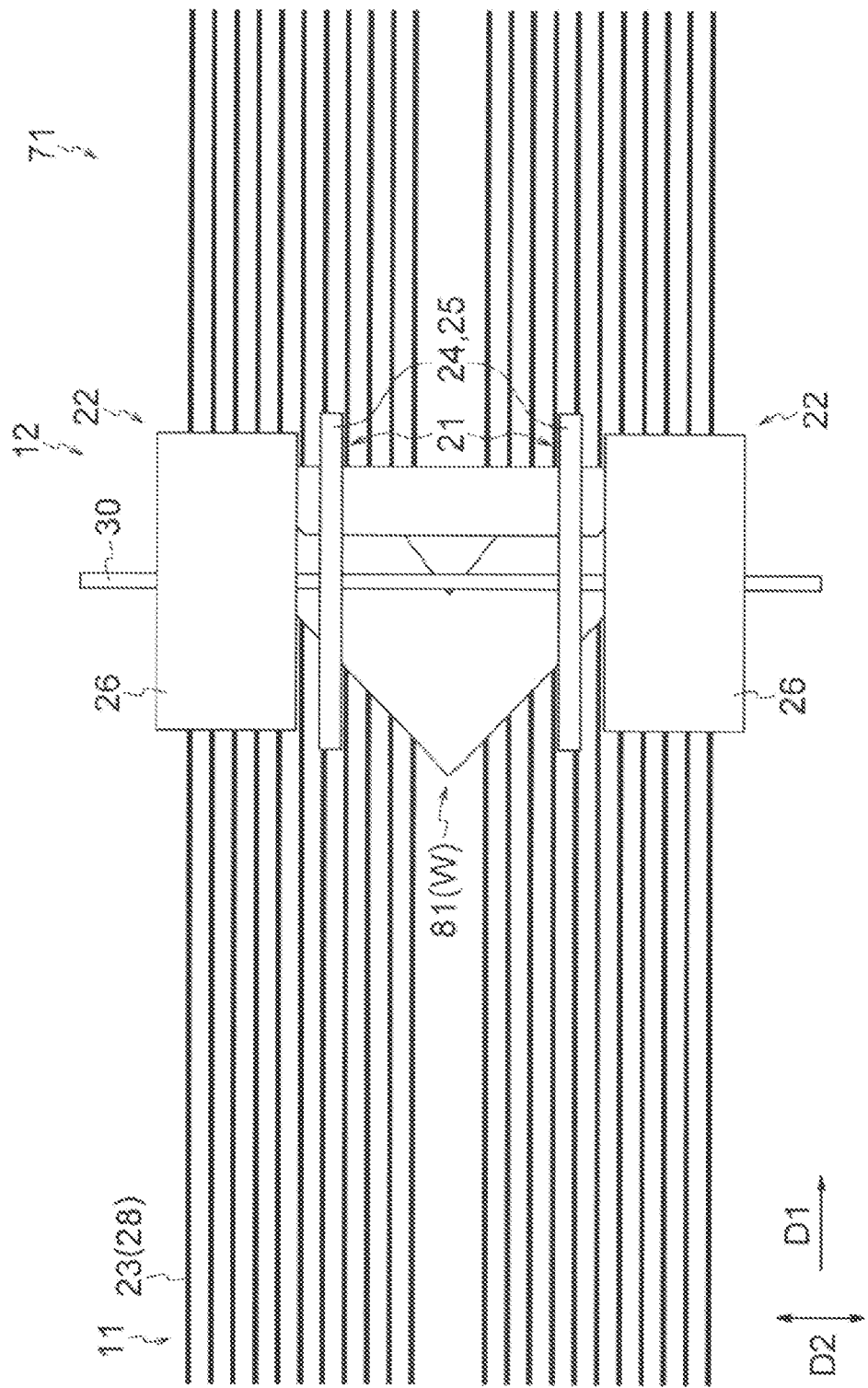
FIG. 6 is a plan view of a bending reference portion formation mechanism.
Figure 7:
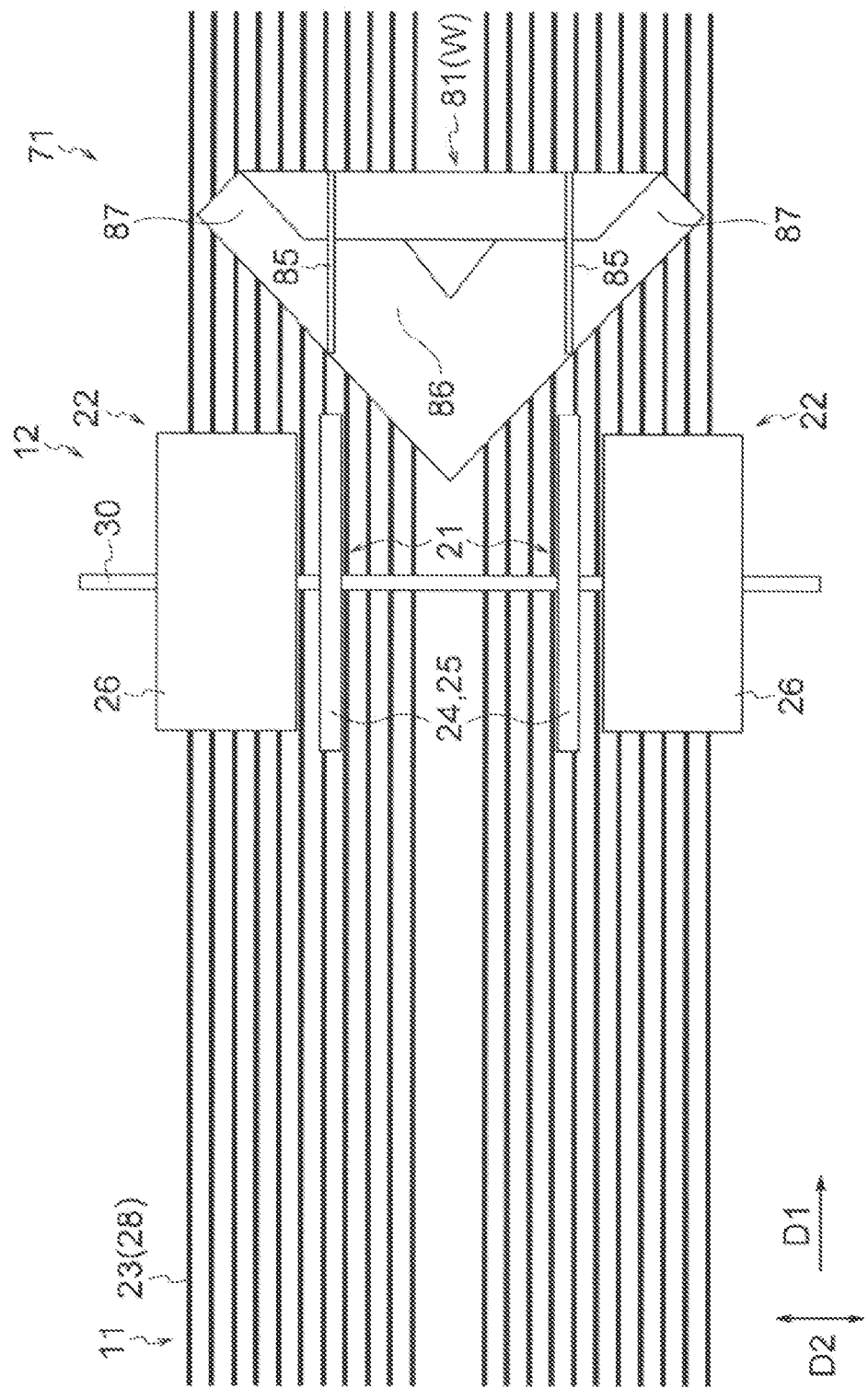
FIG. 7 is a plan view of a bending reference portion formation mechanism.
Figure 8:
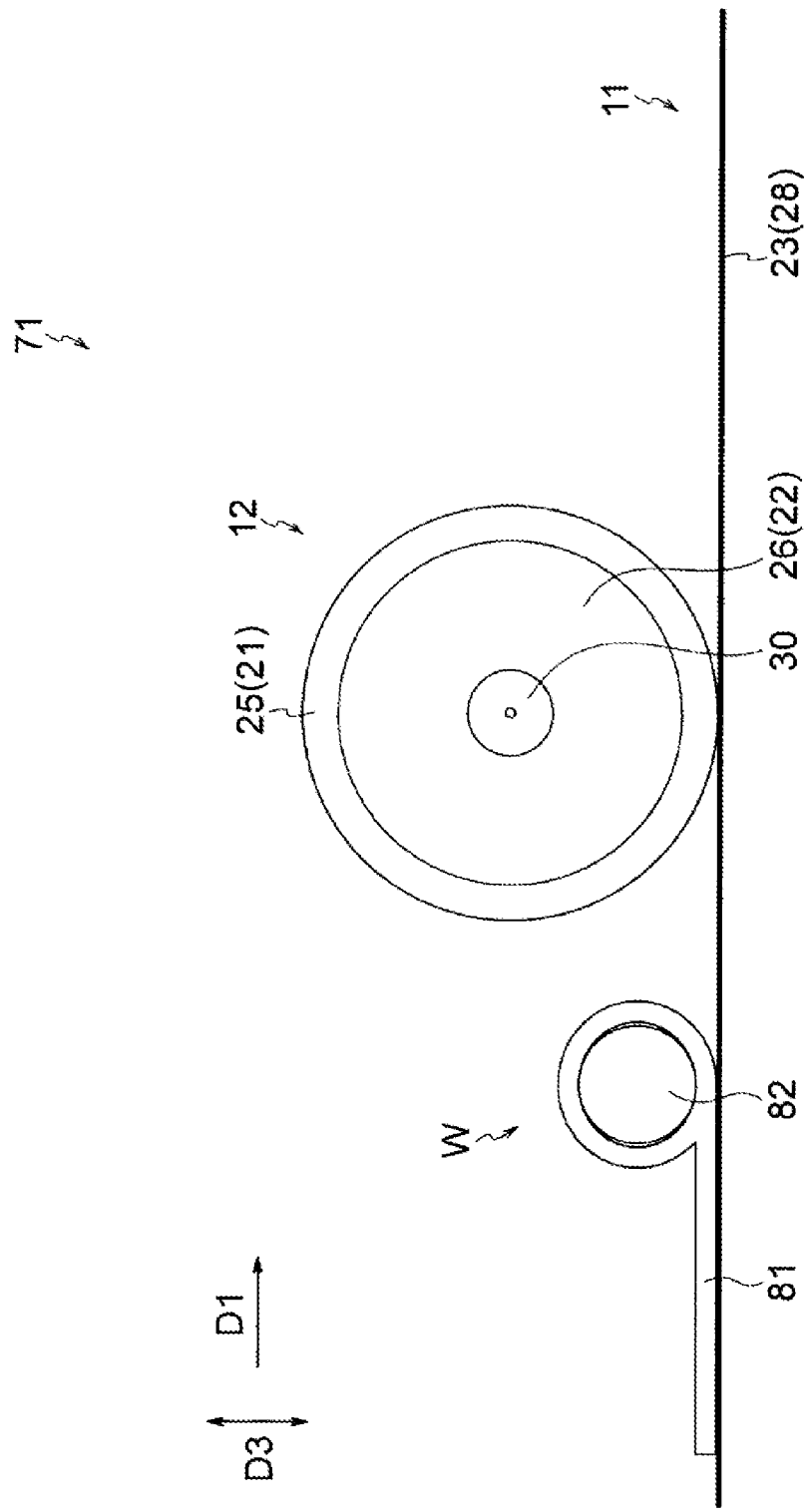
FIG. 8 is a side view of a bending reference portion formation mechanism.

FIGS. 5 to 7 are plan views of the bending reference portion formation mechanism 71. FIGS. 8 to 13 are side views of the bending reference portion formation mechanism 71. Further, although the state of a skin 81 illustrated in FIGS. 5 to 13 does not necessarily exactly correspond to the state of a skin 81 illustrated in FIGS. 1C and 1D described above, FIGS. 5 to 13 are drawings corresponding to the third folding/fourth folding step S4 (see FIG. 2).

The bending reference portion formation mechanism (the food material processing mechanism) 71 of the present embodiment comprises: a conveyance unit 11 which conveys a sheet-shaped skin 81 in a conveyance direction D1; and a processing unit 12 which forms bending reference portions 85 (see FIG. 7), being reference portions for bending, in the skin 81 being conveyed by the conveyance unit 11.

Both the conveyance direction D1 and a width direction D2 are horizontal directions perpendicular to the vertical direction, on which gravity acts, in the present embodiment, but may be directions which are inclined with respect to the horizontal directions and the height direction D3, which is along the vertical direction.

An object conveyed by the conveyance unit 11 is also referred to as a work W. In the present embodiment, an ingredient 82 is already placed on a skin 81 conveyed by the conveyance unit 11 (see FIGS. 1A to 1C) and the conveyance unit 11 conveys, in the conveyance direction D1, a skin 81 on which an ingredient 82 has been placed. Therefore, a skin 81 and an ingredient 82 conveyed by the conveyance unit 11 are also collectively referred to as a work W. The conveyance unit 11 may convey a skin 81 only, and in such a case, a work W is constituted by a skin 81 only.

[Conveyance Unit]

The conveyance unit 11 includes a conveyance body 28 which travels in the conveyance direction D1 in a state where a skin 81 (a work W) is placed on the conveyance body 28.

The conveyance body 28 of the present embodiment is configured by a plurality of string-shaped supports 23. Each string-shaped support 23 has an endless shape and extends along the conveyance direction D1. Each string-shaped support 23 is wound around and supported by a rotation shaft (not shown), positioned on the upstream side from the processing unit 12 (for example, reference rollers 25 and pressing rollers 26), and a rotation shaft (not shown), positioned on the downstream side from the processing unit 12 (for example, the reference rollers 25 and the pressing rollers 26), and travels in the conveyance direction D1 in accordance with the axial rotation of at least one of these rotation shafts. Each string-shaped support 23 is reversed at the rotation shaft (not shown) arranged on the downstream side, and travels toward the rotation shaft (not shown) arranged on the upstream side. Further, each string-shaped support 23 is reversed at the rotation shaft (not shown) arranged on the upstream side, and travels toward the rotation shaft (not shown) arranged on the downstream side.

A support portion of the conveyance unit 11 which supports a skin 81 (a work W) is configured by portions of the plurality of string-shaped supports 23 traveling from the upstream side toward the downstream side which come into contact with the skin 81.

The conveyance body 28 of the conveyance unit 11 is not limited to the plurality of string-shaped supports 23 shown in drawings and may adopt an arbitrary configuration capable of appropriately conveying a work W from the upstream side to the downstream side.

At least a part of the conveyance body 28 (i.e., the plurality of string-shaped supports 23) of the conveyance unit 11 of the bending reference portion formation mechanism 71 may be configured by a device shared with the conveyance body of the conveyance unit of the bending mechanism 72 in a later subsequent stage. Specifically, a work W may be conveyed from the bending reference portion formation mechanism 71 to the bending mechanism 72 while the state where the work W is placed on the common conveyance body 28 is maintained.

[Processing Unit]

The processing unit 12 comprises a reference formation unit 21 and a pressing unit 22.

The reference formation unit 21 locally applies a force to a skin 81 to create a bending reference portion 85 (see FIG. 7). The reference formation unit 21 may locally apply a force to only one part of a skin 81 or may locally apply a force to two or more parts of a skin 81. The illustrated reference formation unit 21 applies a force locally to two parts of a skin 81.

The reference formation unit 21 includes a reference pressing unit 24 by which a skin 81 being conveyed in the conveyance direction D1 is pinched jointly with the conveyance body 28. The reference pressing unit 24 of the present embodiment includes a reference roller 25 which rotates while being in contact with a skin 81 being conveyed by the conveyance body 28 of the conveyance unit 11. In the illustrated configuration, a plurality (two) of reference rollers 25 are provided. The two reference rollers 25 (i.e., a first reference roller 25 and a second reference roller 25) are arranged at positions where the two reference rollers 25 are separated from each other in the width direction D2 and are provided between the two pressing rollers 26 (that is, between a first pressing roller 26 and a second pressing roller 26).

In this way, the reference formation unit 21 locally applies a force to two parts of a skin 81 of a work W which are separated from each other in the width direction D2 perpendicular to the conveyance direction D1, so as to form bending reference portions 85 at the two parts. As illustrated in FIG. 7, the bending reference portions 85 formed at the two parts of a skin 81 in this way are provided at positions where the bending reference portions 85 are separated from each other in the width direction D2 and each extend along the conveyance direction D1.

On the other hand, the pressing unit 22 is in contact with a skin 81 and presses the skin 81 toward the conveyance unit 11 to support the skin 81 at least temporarily while the reference formation unit 21 creates the bending reference portions 85 in the skin 81. In particular, the pressing unit 22 of the present embodiment presses a skin 81 against the conveyance unit 11 so as to partially deform the skin 81.

More specifically, the pressing unit 22 includes a pressing roller 26 which rotates while being in contact with a skin 81 being conveyed by the conveyance unit 11. In the illustrated configuration, two pressing rollers 26 are provided. The two pressing rollers 26 (that is, the first pressing roller 26 and the second pressing roller 26) are arranged at positions where the two pressing rollers 26 are separated from each other in the width direction D2 and are located outside the reference rollers 25 in the width direction D2.

Figure 10:
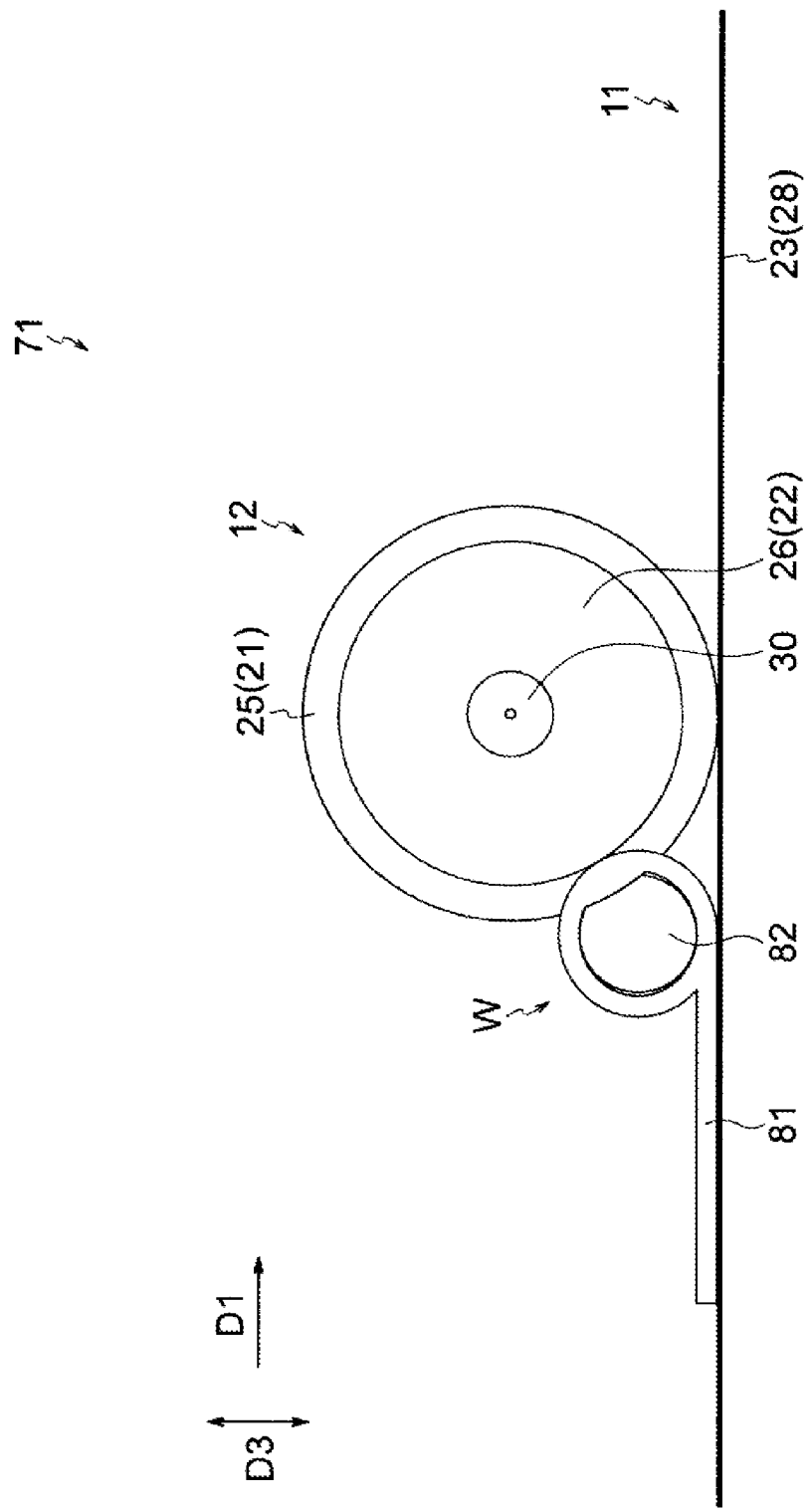
FIG. 10 is a side view of a bending reference portion formation mechanism.
Figure 11:
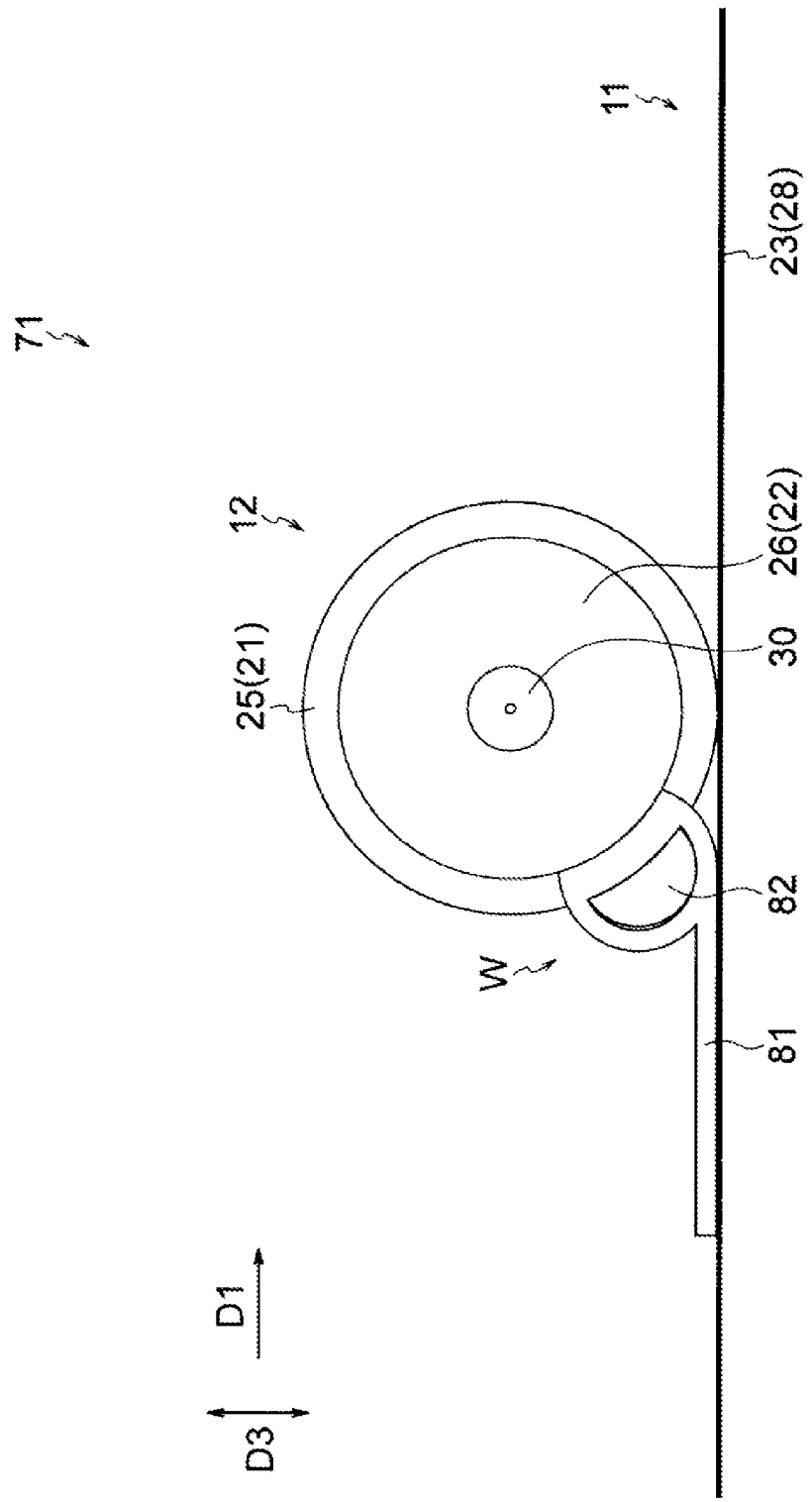
FIG. 11 is a side view of a bending reference portion formation mechanism.
Figure 12:
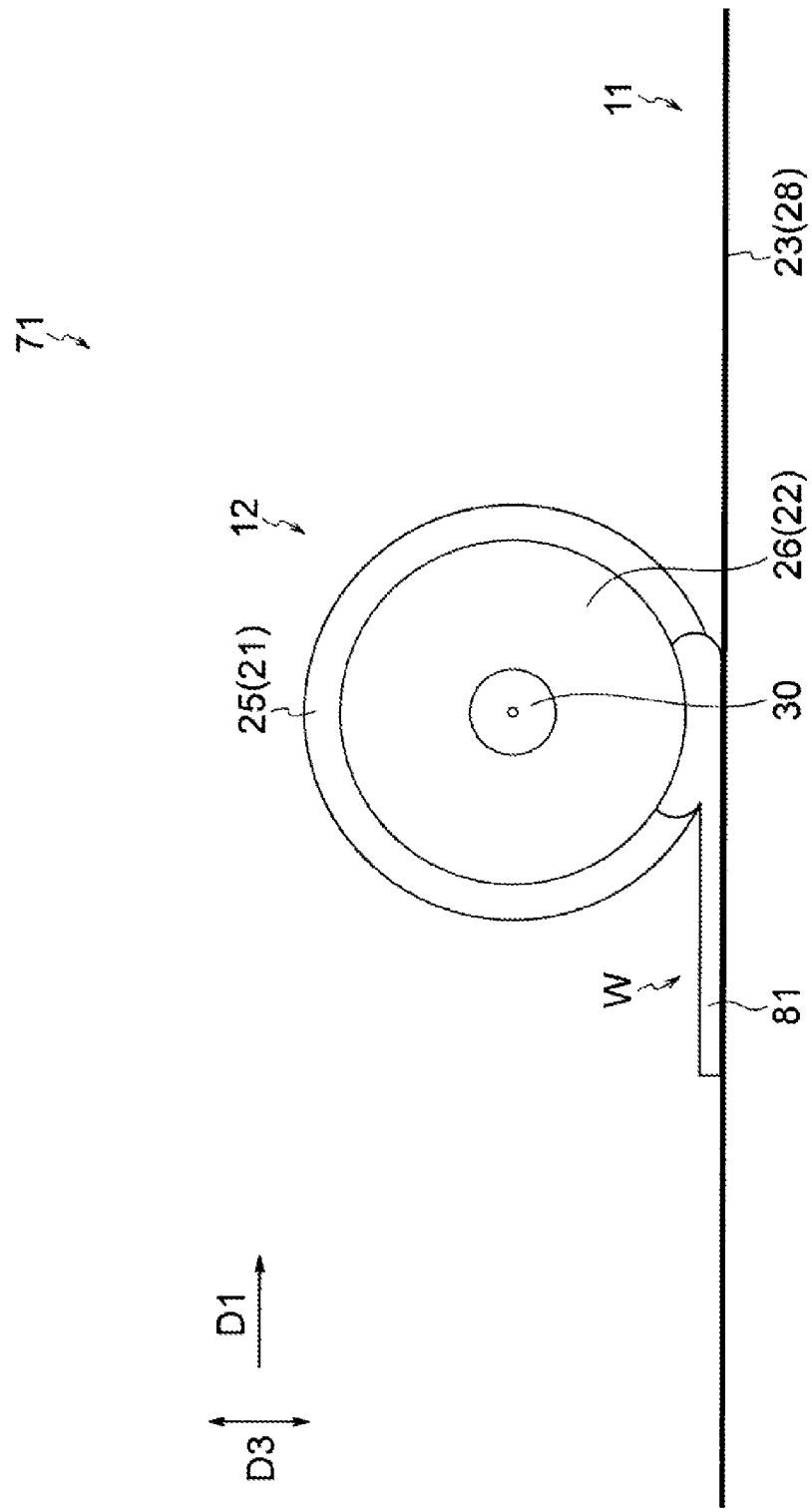
FIG. 12 is a side view of a bending reference portion formation mechanism.
Figure 13:
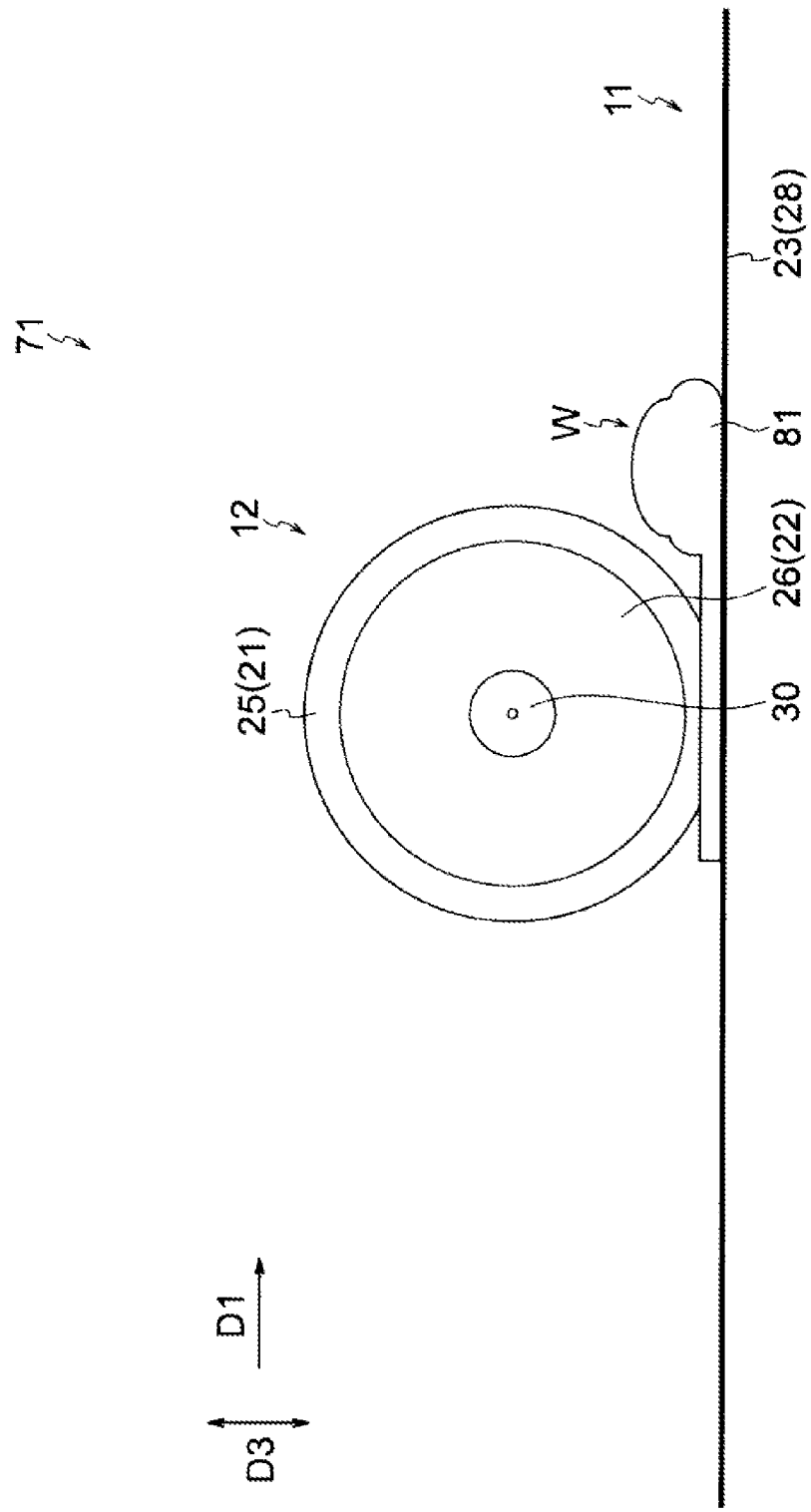
FIG. 13 is a side view of a bending reference portion formation mechanism.

In this way, the pressing unit 22 locally applies a force to two parts of a skin 81 which are separated from each other in the width direction D2 to deform the two parts into a flat shape (see FIGS. 11 to 13). The pressing unit 22 is not limited to the configuration illustrated in FIGS. 5 to 13. For example, one or more pressing rollers 26 (hereinafter, also referred to as "third pressing rollers 26") may be further additionally provided between the two reference rollers 25 (i.e., the first reference roller and the second reference roller) in the width direction D2 (see FIG. 14). Such a third pressing roller(s) 26 may locally apply a force to, for example, a part of a work W corresponding to an ingredient 82 (that is, a part of a skin 81 covering an ingredient 82). In this case, the part of a work W where an ingredient 82 is arranged can be pressed against the conveyance unit 11 to be leveled by the third pressing roller(s) 26, so that it is possible to provide final products (i.e., foods) of high quality in a more stable manner. In one variant example of the bending reference portion formation mechanism 71 illustrated in FIG. 14, one third pressing roller 26 is fixedly attached, together with the first pressing roller 26 and the second pressing roller 26 described above, to a rotation shaft member 30. The diameter of the third pressing roller 26 has a size suitable for leveling an ingredient 82 of a work W and is typically smaller than the diameter of each reference roller 25.

Figure 14:
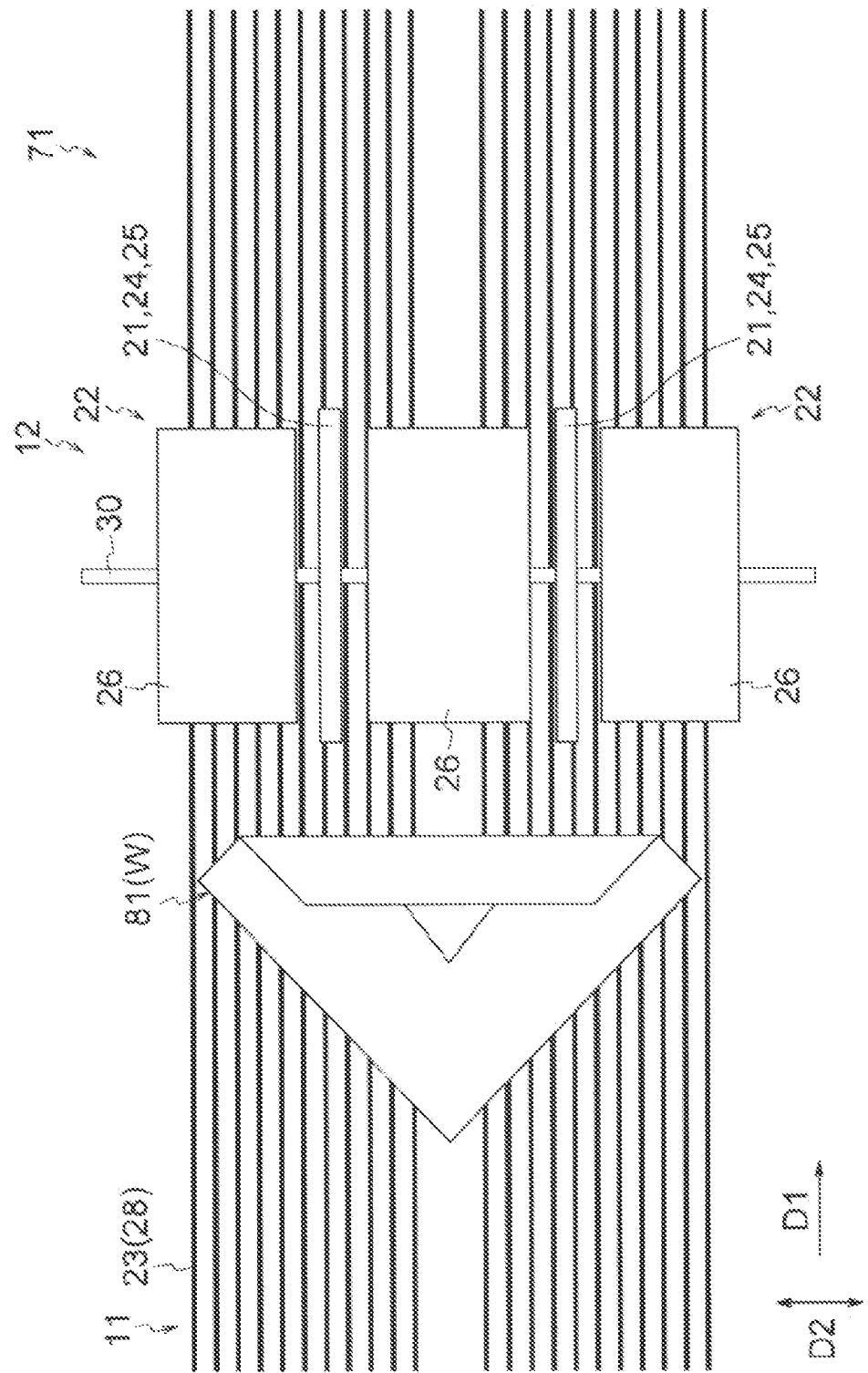
FIG. 14 is a plan view showing a variant example of a bending reference portion formation mechanism.

In the example illustrated in FIG. 14, the part of a work W corresponding to the ingredient 82 is pressed against the conveyance unit 11 by one roller (i.e., the third pressing roller), but the part of a work W corresponding to the ingredient 82 may be pressed by two or more rollers.

The two reference rollers 25 and the two pressing rollers 26 described above have a coaxial structure and are attached to the common rotation shaft member 30. Specifically, the rotation center axis of each reference roller 25 and the rotation center axis of each pressing roller 26 are positioned on the same straight line. In the illustrated configuration, the rotation shaft member 30 is provided on a straight line extending along the width direction D2, and the two reference rollers 25 and the two pressing rollers 26 are fixedly attached to the rotation shaft member 30. By rotating the rotation shaft member 30 around its axis, each reference roller 25 and each pressing roller 26 rotate together with the rotation shaft member 30.

The diameter of each reference roller 25 is larger than the diameter of each pressing roller 26. As a result, the maximum value (for example, unit: MPa (megapascal)) of the pressure applied to a skin 81 by the reference formation unit 21 (that is, each reference roller 25) is higher than the maximum value of the pressure applied to the skin 81 by the pressing unit 22 (that is, each pressing roller 26). The two reference rollers 25 have the same diameter as each other, and the two pressing rollers 26 have the same diameter as each other. The "diameter" referred to here is a size in a radial direction with reference to the center axis (that is, the rotation axis of the rotation shaft member 30) and can be represented by, for example, the size in the height direction D3.

The width (that is, the size in the width direction D2) of each reference roller 25 and each pressing roller 26 is not limited in particular. Typically, the width of a bending reference portion 85 formed in a skin 81 is narrow, and therefore the width of each reference roller 25 is small. On the other hand, the width of each pressing roller 26 can vary depending on the shaping width of a work W, but in many cases, is larger than the width of each reference roller 25. Specifically, in terms of the width direction D2, each reference roller 25 (the reference formation unit 21) is smaller than each pressing roller 26 (the pressing unit 22), and the contact width of each reference roller 25 with respect to a work W is smaller than the contact width of each pressing roller 26 with respect to a work W. For example, each reference roller 25 is arranged so as to pass in the vicinity of an ingredient 82 placed on a skin 81. Further, each pressing roller 26 may be arranged so as to pass over the entire of a corresponding end portion of a skin 81 (a work W). Further pressing roller 26 may be arranged so as to pass not only a corresponding end portion of a skin 81 but also the outer side of the corresponding end portion in the width direction D2.

As described above, the reference formation unit 21 is provided to form, in a skin 81, bending reference portions 85 which enables the skin 81 to be properly folded by the bending mechanism 72 and a wrapping mechanism 73 in the subsequent stage. Therefore, each reference roller 25 needs to locally apply a relatively strong pressure to a skin 81. Therefore, in the height direction D3, each reference roller 25 is located closer to the conveyance body 28 than each pressing roller 26 is. Therefore, the minimum distance between the conveyance body 28 and each reference roller 25 is smaller than the minimum distance between the conveyance body 28 and each pressing roller 26. The bending reference portions 85 may be formed only in relatively thick parts of a work W in which a plurality of layers of a skin 81 are stacked or may be formed not only in relatively thick parts in which a plurality of layers of a skin 81 are stacked but also in parts in which only a single layer of a skin 81 exists. In a case where the bending reference portions 85 are formed in parts of a work W where only a single layer of a skin 81 exists, the minimum distance between the conveyance body 28 and each reference roller 25 is smaller than the thickness of the skin 81 (that is, the thickness of a single layer skin 81) of the work W before the work W makes contact with each reference roller 25.

On the other hand, the pressing unit 22 is provided to deform both end portions of a work W (i.e., both end portions of a skin 81 in the vertical direction in FIGS. 5 to 7 (see "bending portions 87" in FIG. 7)) into a flat shape while pressing the both end portions of the work W. Therefore, each pressing roller 26 is required to partially press a skin 81 of a work W but is not required to apply an excessive pressure to the skin 81. In particular, in the illustrated example, while only relatively thick parts of a work W in which a plurality of layers of a skin 81 are stacked are deformed by the respective pressing rollers 26, each pressing roller 26 does not make contact with and does not substantially apply a force to a relatively thin part in which only a single layer of a skin 81 exists. Therefore, in terms of the height direction D3, each pressing roller 26 is located farther from the conveyance body 28 than each reference roller 25. More specifically, the minimum distance between the conveyance body 28 and each pressing roller 26 is larger than the thickness of a skin 81 (that is, the thickness of a single layer skin 81) of a work W before the work W makes contact with each reference roller 25 and each pressing roller 26.

Formation of bending reference portions in a work W (in particular, a skin 81) and flat deformation of both end portions of the work W can be simultaneously performed by the reference rollers 25 and the pressing rollers 26 having the above-described configuration. Then, a skin 81 of a work W which has been subjected to the above-described processing by the bending reference portion formation mechanism 71 is accurately and smoothly folded, in a state where the resistance is reduced, by the bending mechanism 72 and the wrapping mechanism 73 in the subsequent stage.

Figure 9:
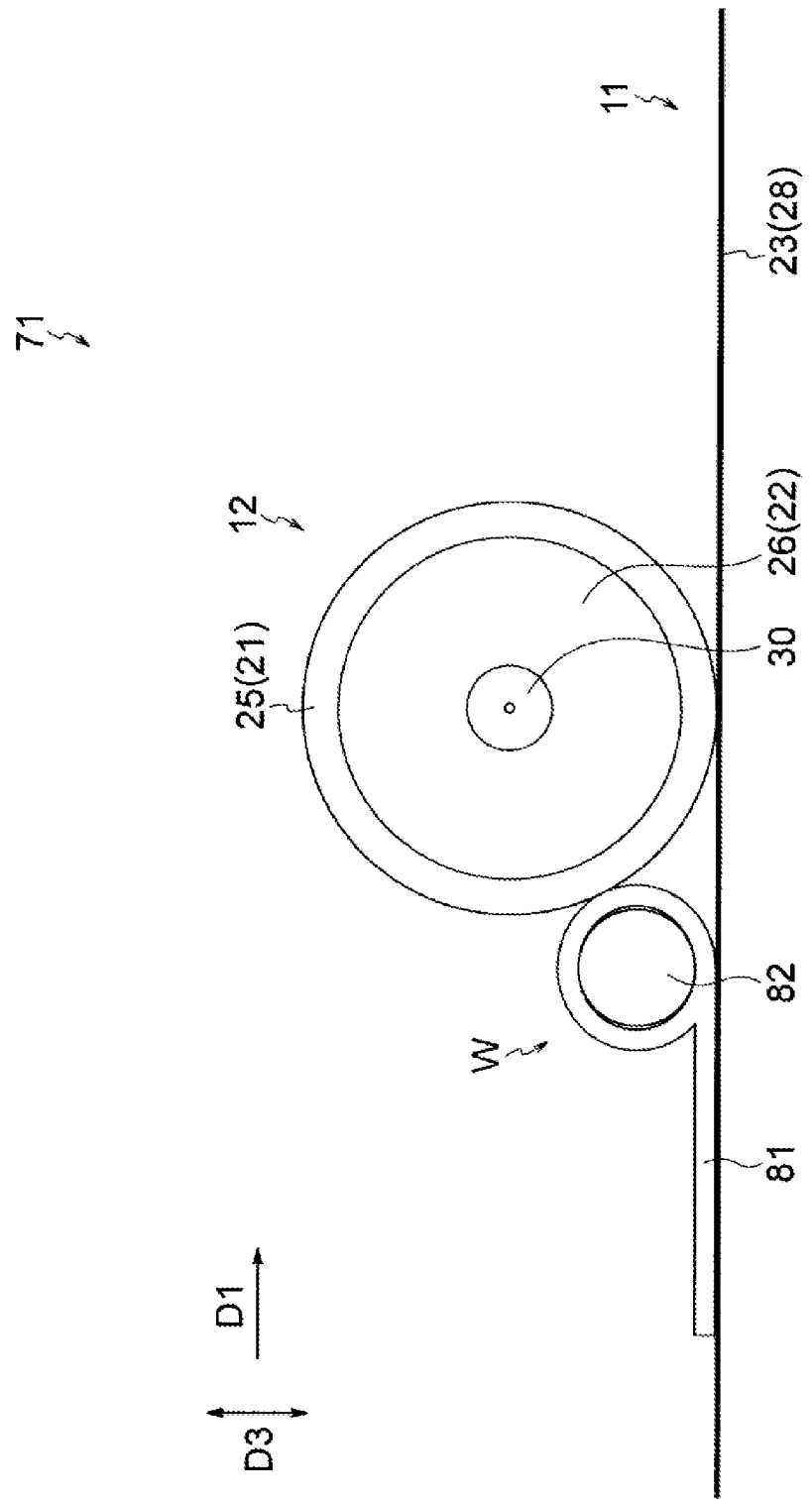
FIG. 9 is a side view of a bending reference portion formation mechanism.

Further, according to the above-described configuration, before the pressing rollers 26 of the pressing unit 22 start to press a skin 81 of a work W against the conveyance body 28 of the conveyance unit 11, the reference rollers 25 of the reference formation unit 21 start to apply a force to the skin 81 (see FIGS. 9 and 10). In other words, after each reference roller 25 comes into contact with a skin 81 of a work W, each pressing roller 26 comes into contact with the skin 81 of the work W. Therefore, each pressing roller 26 can press a skin 81 of a work W against the conveyance body 28 in a state where each reference roller 25 presses the work W against the conveyance body 28. As a result, each pressing roller 26 can accurately press both end portions of a work W and a skin 81 can be accurately shaped.

[Food Material Processing Method]

The food material processing method performed by the bending reference portion formation mechanism 71 described above includes a step of conveying a sheet-shaped skin 81 in the conveyance direction D1 by the conveyance unit 11.

Specifically, a work W is conveyed from the upstream side to the downstream side by the conveyance body 28 of the conveyance unit 11 and the work W passes through the reference rollers 25 and the pressing rollers 26, so that bending reference portions 85 are formed in the work W (in particular, the skin 81) and both end portions of the work W (i.e., the bending portions 87 of the skin 81) are shaped flat.

On this occasion, the reference rollers 25 and the pressing rollers 26 are positively rotated via the rotation shaft member 30 in such a manner that the portion of each of the two reference rollers 25 and the two pressing rollers 26 which is in contact with a skin 81 of a work W is positively moved in the conveyance direction D1. As a result, the conveyance toward the downstream side of the work W sandwiched between the conveyance body 28 and each of the two reference rollers 25 and the two pressing rollers 26 is promoted not only by the conveyance body 28 but also by each reference roller 25 and each pressing roller 26. The rotation speed of each reference roller 25 and each pressing roller 26 is determined according to the conveyance speed of a work W by the conveyance body 28. The rotation of the rotation shaft member 30, each reference roller 25, and each pressing roller 26 is performed by power transmitted from a power generator such as a motor (not illustrated), and the rotation speed thereof is adjusted by controlling the power generator by a control unit (not shown).

Each reference roller 25 and each pressing roller 26 may not be positively rotated. In this case, each reference roller 25 and each pressing roller 26 are provided so as to freely rotate around the rotation shaft member 30. As an example, the reference rollers 25 and the pressing rollers 26 may be attached to the rotation shaft member 30 so as to freely rotate. Alternatively, the reference rollers 25 and the pressing rollers 26 may be fixedly attached to the rotation shaft member 30 while being provided so as to freely rotate along with the rotation shaft member 30. In this case, a work W is conveyed only by the conveyance body 28 in the conveyance direction D1, and each reference roller 25 and each pressing roller 26 which are in contact with a work W can press the skin 81 of the work W toward the conveyance body 28 while passively rotating around the rotation shaft member 30 according to the movement of the work W. However, from the viewpoint of reliably conveying a work W, it is preferable to rotate at least the reference rollers 25 (more preferably, both the reference rollers 25 and the pressing rollers 26) of the reference rollers 25 and the pressing rollers 26 in synchronization with the conveyance unit 11 (the conveyance body 28). For example, by setting the moving speed of the reference rollers 25 in the conveyance direction D1 to be almost the same as or substantially the same as the moving speed of the conveyance body 28 (each string-shaped support 23) in the conveyance direction D1, it is possible to apply propulsive force in the conveyance direction D1 to a work W from both the conveyance body 28 and the reference rollers 25.

A skin 81 (a work W) in which bending reference portions 85 have been formed in this way is sent from the bending reference portion formation mechanism 71 to the bending mechanism 72 and the wrapping mechanism 73 (see FIG. 4) by the conveyance unit 11, and is neatly folded by the bending mechanism 72 and the wrapping mechanism 73 as illustrated in FIG. 1D.

As described above, according to the present embodiment, bending reference portions 85 can be accurately formed at desired positions of a skin 81 of a work W. As a result, a skin 81 of a work W can be bent and folded with high accuracy by devices (that is, the bending mechanism 72 and the wrapping mechanism 73) in later stages.

Further, the formation of bending reference portions 85 and the local shaping of a skin 81 can be simultaneously performed by each reference roller 25 and each pressing roller 26 having a coaxial structure. Therefore, it is possible to urge the acceleration of processing as compared with a case where these processes are performed separately. In particular, in a state where one of a reference roller 25 and a pressing roller 26 is supporting a skin 81, the other applies pressure to the skin 81, and thus, the position of the skin 81 during processing can be prevented from shifting, and the formation of bending reference portions 85 and the local shaping of a skin 81 can be performed with high accuracy. Further, since each reference roller 25 and each pressing roller 26 are supported by the common rotation shaft member 30, each reference roller 25 and each pressing roller 26 can be rotated by rotating the rotation shaft member 30 with a single power generator.

Further, the high-precision folding and the high-speed processing of the skin 81 of a work W are realized as described above, the bottleneck can be eliminated and the productivity of food can be improved as a whole system.

On the other hand, in some conventional apparatuses and methods, both end portions of a work (a skin) are pressed to be shaped by a pair of rollers, but there is no device and no method of performing the above-described formation of bending reference portions 85 simultaneously with such shaping. For example, in a conventional apparatus in which a pair of rollers is moved downward from a retracted position according to the conveyance of a work to be arranged at a position where the pair of rollers can make contact with the work and is moved back to the retracted position again after the shaping of the work, the formation of a bending reference portion 85 and the local shaping of a skin 81 (a work W) cannot be simultaneously performed.

Variant Examples

Both the reference formation unit 21 and the pressing unit 22 have rollers (i.e., the reference rollers 25 and pressing rollers 26) in the illustrated configuration, but only at least one of the reference formation unit 21 and the pressing unit 22 may have a roller which rotates while being in contact with a skin 81 being conveyed by the conveyance unit 11. Further, both the reference formation unit 21 and the pressing unit 22 may be configured by a pressing device other than rollers. Such a pressing device is not limited in particular and, for example, may have an endless belt which is capable of reciprocating along the conveyance direction D1 and applying an appropriate pressure to a skin 81 of a work W being conveyed by the conveyance unit 11. The traveling track of the endless belt may be a circular track or a non-circular track, and may partially include a track extending horizontally in the conveyance direction D1.

Further, the reference rollers 25 and the pressing rollers 26 do not have to have a coaxial structure. The center axis of the reference rollers 25 and the center axis of the pressing rollers 26 may be deviated from each other in a direction along the conveyance direction D1. Further, even in a case where the reference formation unit 21 and/or the pressing unit 22 are configured by pressing devices other than rollers, one (for example, the reference formation unit 21) of the reference formation unit 21 and the pressing unit 22 may be located relatively upstream in the conveyance direction D1 and the other (for example, the pressing unit 22) may be located relatively downstream in the conveyance direction D1.

Further, the number of reference rollers 25 and the number of pressing rollers 26 are not limited, and the number of the reference rollers 25 and the number of pressing rollers 26 may be one or may be three or more. From the viewpoint of preventing the displacement of a skin 81 (for example, the movement of a skin 81 in a rotation direction) by the pressing rollers 26, it is preferable to install a plurality of pressing rollers 26, and in particular, it is preferable that two or more among the plurality of pressing rollers 26 are arranged in positions where the two or more among the plurality of pressing rollers 26 are separated from each other in the width direction D2.

[Bending Mechanism]

Next, an example of the bending mechanism 72 (see FIG. 4) will be described. The bending reference portion formation mechanism 71 and the food material processing method described above may be used in combination with a bending mechanism 72 having a configuration other than the configuration described below.

Figure 15:
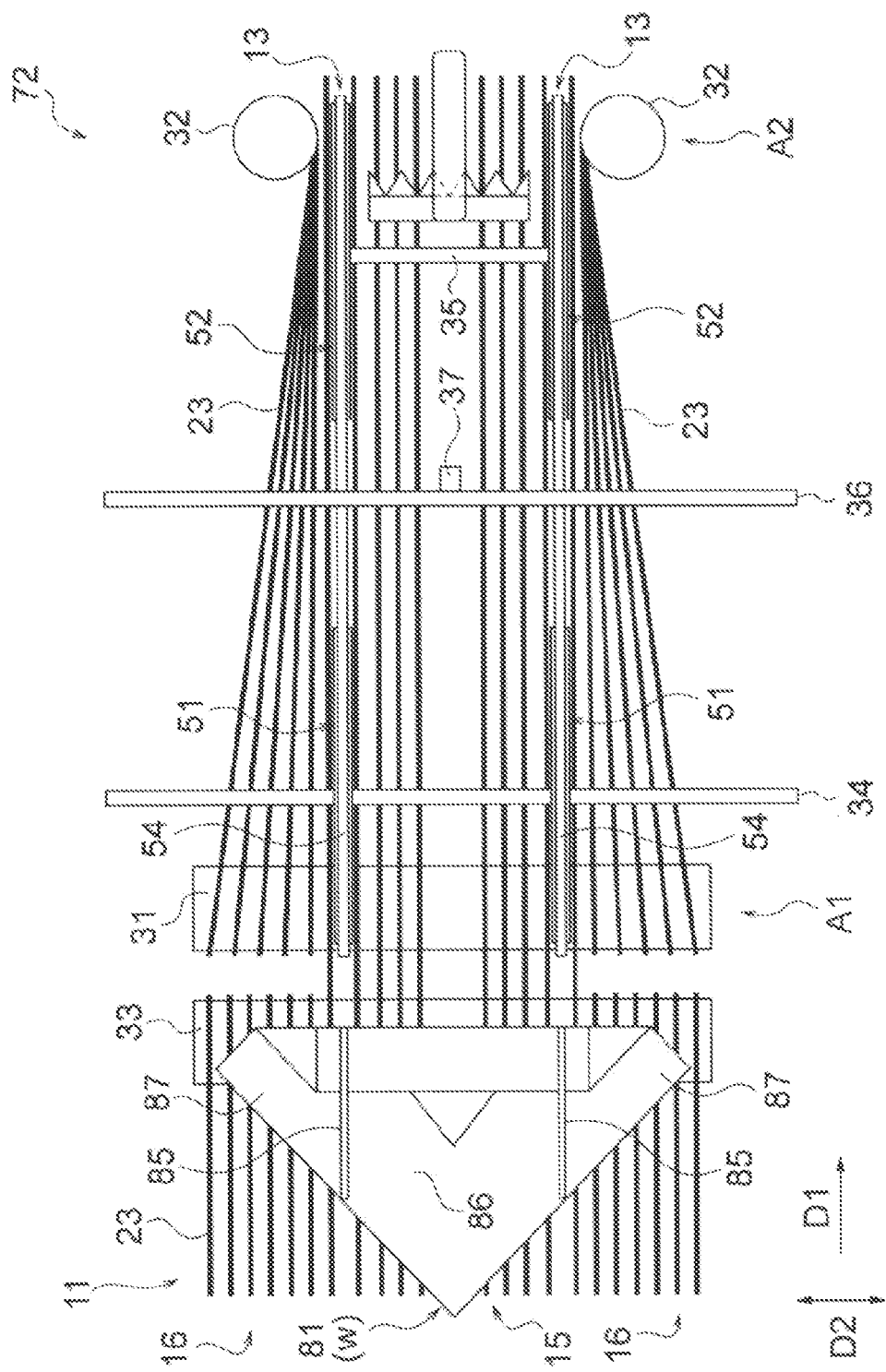
FIG. 15 is a plan view of a bending mechanism.
Figure 16:
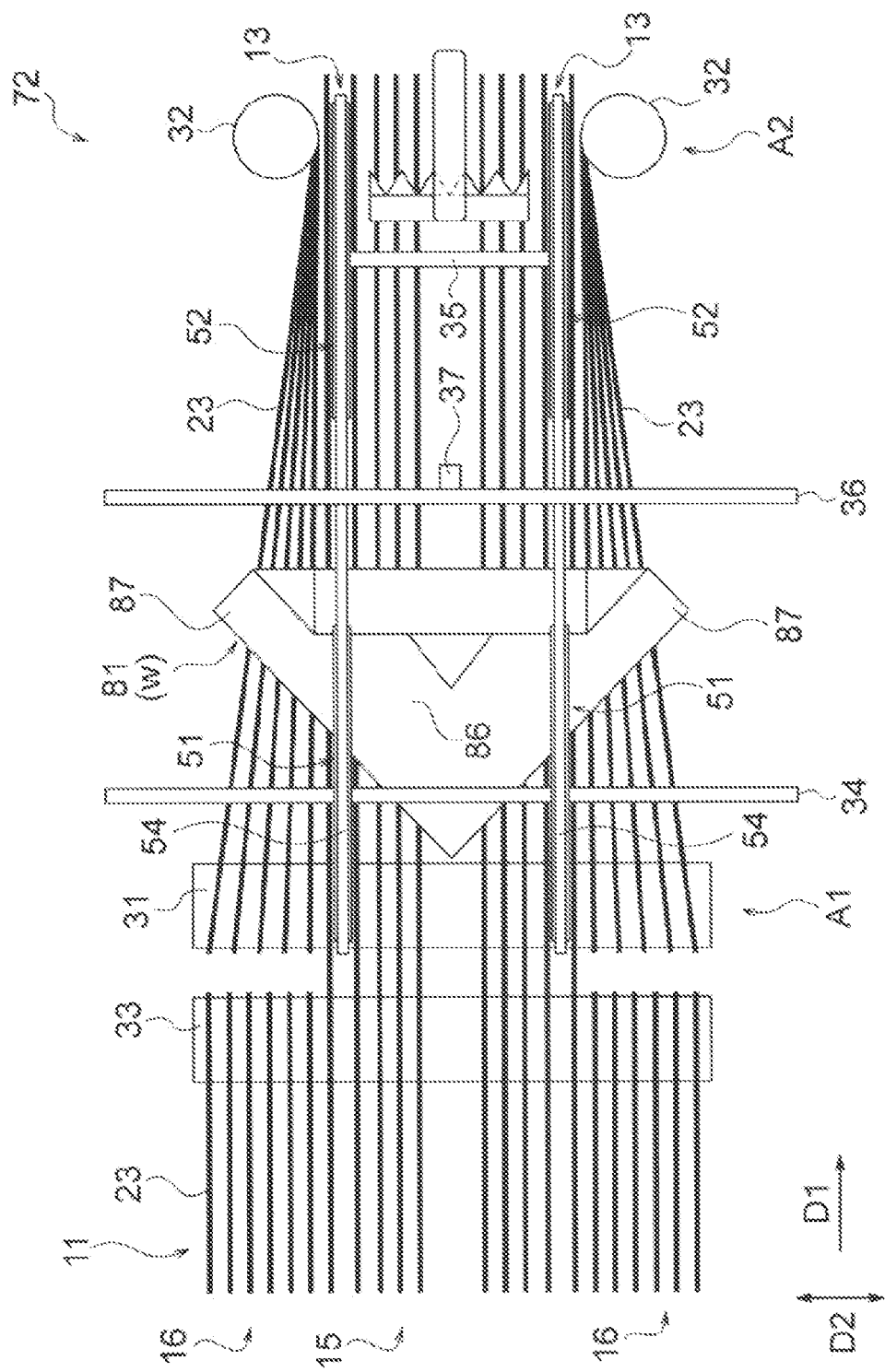
FIG. 16 is a plan view of a bending mechanism.
Figure 17:
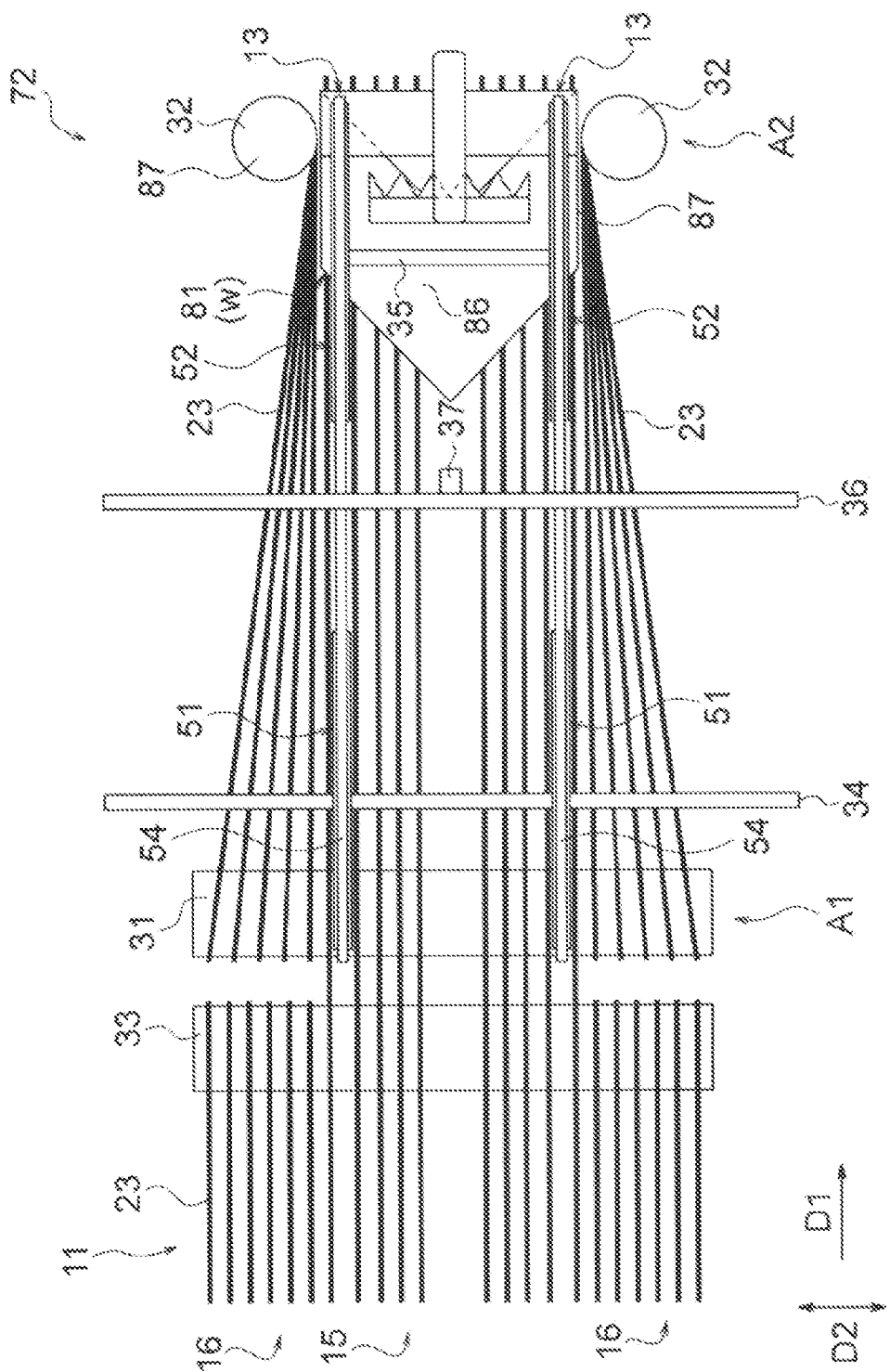
FIG. 17 is a plan view of a bending mechanism.

FIGS. 15 to 17 are plan views of a bending mechanism 72. FIGS. 18 to 23 are side views of the bending mechanism 72. For ease of understanding, the illustration of some of the elements constituting the bending mechanism 72 is omitted in each of FIGS. 15 to 23. For example, in FIGS. 15 to 17, the illustration of a relay guide unit 53 and a moving body guide 39 is omitted. Further, in FIGS. 18 to 23, the illustration of a third support shaft 36 is omitted. Further, although the state of a skin 81 shown in FIGS. 15 to 23 does not necessarily exactly correspond to the state of a skin 81 shown in FIGS. 1C and 1D described above, FIGS. 15 to 23 are drawings corresponding to the third folding/fourth folding step S4 (see FIG. 2).

The bending mechanism 72 of the present embodiment is a mechanism which bends a skin 81 for a spring roll and comprises the conveyance unit 11 and support units 13. In order to fold a skin 81 neatly as illustrated in FIG. 1D, both end portions of a skin 81 are raised by the bending mechanism 72, and after that, the skin 81 is folded by the wrapping mechanism 73 in such a manner that the both end portions are stacked on an ingredient 82.

The bending mechanism 72 conveys a skin 81 in the conveyance direction D1, while sandwiching the skin 81 between the conveyance unit 11 and each support unit 13, so that both end portions of the skin 81 are raised with high accuracy as the displacement (in particular, the displacement in a width direction D2 perpendicular to the conveyance direction D1) of the skin 81 placed on the conveyance unit 11 is prevented.

As illustrated in FIG. 15, the bending reference portions 85 formed in two parts of a skin 81 are provided at positions where the bending reference portions 85 are separated from each other in the width direction D2. While each of these bending reference portions 85 is sandwiched between the conveyance unit 11 and a support unit 13, the skin 81 is sent from the upstream side to the downstream side in a state where both end portions in the width direction D2 (that is, bending portions 87) of the skin 81 are supported by a twisted string conveyor, so that both end portions of the skin 81 are continuously and gradually raised.

A skin 81 bent into a desired shape by the bending mechanism 72 is sent to the wrapping mechanism 73 in the subsequent stage (see FIG. 4) and is neatly folded, as illustrated in FIG. 1D, by the wrapping mechanism 73.

[Skin (Sheet-Shaped Flexible Food Material)]

A skin 81 has bending reference portions 85, a base portion 86, and bending portions 87.

The bending reference portions 85 are parts of a skin 81 which form creases, and are formed in the skin 81 by the bending reference portion formation mechanism 71 (see FIGS. 5 to 13) before the work W (i.e., the skin 81 and an ingredient 82) is sent to the bending mechanism 72. In the present embodiment, the bending reference portions 85 are formed at two locations in a skin 81. Each bending reference portion 85 extends along the conveyance direction D1 of a skin 81.

The base portion 86 is a part of a skin 81 located on one side with reference to the bending reference portions 85. The base portion 86 of the present embodiment is configured by a portion of a skin 81 located between the two bending reference portions 85. Specifically, the base portion 86 is formed by the central portion in the width direction D2 of a skin 81. While a skin 81 is conveyed by the conveyance unit 11, the base portion 86 keeps its state of extending in a horizontal direction and is sent from the upstream side towards the downstream side.

The bending portions 87 are parts of a skin 81 which are located on the other side with reference to the bending reference portions 85. The bending portions 87 of the present embodiment are configured by two end portions (i.e., the upper end portion and the lower end portion in FIGS. 15 to 17) of a skin 81 which are opposite to each other. Specifically, the bending portions 87 are configured by both end portions in the width direction D2 of a skin 81. As a skin 81 is conveyed from the upstream side toward the downstream side by the conveyance unit 11, each bending portion 87 is raised little by little.

[Conveyance Unit]

The conveyance unit 11 conveys a skin 81 (that is, a work W) in such a manner that the skin 81 passes through a second conveyance area A2 after passing through a first conveyance area A1.

The first conveyance area A1 and the second conveyance area A2 are separated from each other in a horizontal direction (in particular, the conveyance direction D1). The first conveyance area A1 of the present embodiment is an upstream area with reference to the upstream end portion of each support unit 13 and is an area in the vicinity of a first rotation shaft 31. The second conveyance area A2 of the present embodiment is a downstream area with reference to the downstream end portion of each support unit 13 and is an area in the vicinity of second rotation shafts 32. In the present embodiment, the range of the first conveyance area A1 in the conveyance direction D1 is defined with reference to first support rollers 51 (in particular, the center axis of the first support rollers 51), and the range of the second conveyance area A2 in the conveyance direction D1 is defined with reference to second support rollers 52 (in particular, the center axis of the second support rollers 52).

The whole of the conveyance unit 11 of the present embodiment is configured by a plurality of string-shaped supports 23. Each string-shaped support 23 extends in the conveyance direction D1.

The conveyance unit 11 includes: a first component part 15 which supports the base portion 86 of a skin 81 located on one side with respect to each bending reference portion 85; and second component parts 16 which support the bending portions 87, located on the other side, of a skin 81. In the present embodiment, two bending portions 87 of a skin 81 are arranged in such a manner that one base portion 86 is arranged between the two bending portions 87 as described above, and therefore, two second component parts 16 are provided in such a manner that one first component part 15 is arranged between the two second component parts 16.

Each of the string-shaped supports 23 forming the first component part 15 has an endless shape and extends along the conveyance direction D1. Each of the string-shaped supports 23 forming the first component part 15 is wound around and supported by a rotation shaft (not shown) arranged on the upstream side (for example, on the upstream side from a conveyance rotation shaft 33) and a third rotation shaft 48 (see FIGS. 18 to 23) arranged on the downstream side (for example, on the downstream side from a position where the distance in the height direction D3 between the first component part 15 and the second support rollers 52 is minimized (in the illustrated example, on the downstream side from a second support shaft 35)), and travels in the conveyance direction D1 in accordance with the axial rotation of at least one of these rotation shafts.

Each of the string-shaped supports 23 forming the first component part 15 is reversed at the third rotation shaft 48 arranged on the downstream side and travels toward the rotation shaft (not shown) arranged on the upstream side. Further, each of the string-shaped supports 23 forming the first component part 15 is reversed at the rotation shaft (not shown) arranged on the upstream side and travels toward the third rotation shaft 48 arranged on the downstream side.

At least a part of the conveyance unit 11 in the bending mechanism 72 shown in drawings is shared with the conveyance unit 11 in the bending reference portion formation mechanism 71. Specifically, each of the string-shaped supports 23 forming the first component part 15 extends over the bending reference portion formation mechanism 71 and the bending mechanism 72. Further, each of the string-shaped supports 23 forming the second component parts 16 and being wound around and supported by the conveyance rotation shaft 33 extends over the bending reference portion formation mechanism 71 and the bending mechanism 72. However, the conveyance unit 11 in the bending mechanism 72 may be provided as a different member from the conveyance body 28 of the conveyance unit 11 in the bending reference portion formation mechanism 71.

The support portion of the first component part 15 which makes contact with the base portion 86 of a skin 81 is configured by portions of a plurality of string-shaped supports 23 traveling from the upstream side toward the downstream side which come into contact with the skin 81. The plurality of string-shaped supports 23 traveling from the upstream side toward the downstream side are supported by a moving body guide 39 from below (see FIGS. 18 to 23) so as to be able to travel in the conveyance direction D1. This prevents the position in the height direction D3 of the first component part 15 from fluctuating due to the influence of the weight of a work W (i.e., a skin 81 and an ingredient 82), and thus the support portion of the first component part 15 is kept at almost the same height direction position over the range from the first conveyance area A1 to the second conveyance area A2.

The first component part 15 is not limited to the plurality of string-shaped supports 23 illustrated in drawings and may adopt an arbitrary structure capable of appropriately conveying the base portion 86 of a skin 81 from the upstream side to the downstream side.

The illustrated second component parts 16 include: a plurality of string-shaped supports 23 arranged on the upstream side from the first conveyance area A1 (that is, on the upstream side from the first rotation shaft 31); and a plurality of string-shaped supports 23 arranged over the range from the first conveyance area A1 to the second conveyance area A2.

The conveyance rotation shaft 33 is provided on the upstream side from the first conveyance area A1. The conveyance rotation shaft 33 extends in the width direction D2. The first rotation shaft 31 extends parallel to the conveyance rotation shaft 33 at a position away from the conveyance rotation shaft 33 in the conveyance direction D1. The plurality of string-shaped supports 23 forming the second component parts 16 on the upstream side from the first conveyance area A1 have an endless shape, are wound around and supported by the conveyance rotation shaft 33 and a rotation shaft (not shown) provided on the upstream side from the conveyance rotation shaft 33, and travel along the conveyance direction D1 according to the axial rotation of at least one of these rotation shafts.

On the other hand, the plurality of string-shaped supports 23 forming the second component parts 16 which support the bending portions 87 while a skin 81 is conveyed from the first conveyance area A1 to the second conveyance area A2 have an endless shape and are wound around and supported by the first rotation shaft 31 and the second rotation shafts 32.

The first rotation shaft 31 extends along a horizontal direction, Specifically, the first rotation shaft 31 is arranged in the vicinity of the upstream end portion of each support unit 13 and extends in the width direction D2. With respect to the conveyance direction D1, the center axis (that is, the rotation axis) of the first rotation shaft 31 may be arranged on the upstream side or on the downstream side from the central axes of the first support rollers 51, or may be arranged at the position which is the same as the central axes of the first support rollers 51. The second rotation shafts 32 extend in a direction which is not along a horizontal direction. Specifically, the second rotation shafts 32 are arranged in the vicinity of the downstream end portions of the respective support units 13 and extend along the height direction D3, With respect to the conveyance direction D1, the central axes of the second rotation shafts 32 (that is, the rotation axes) may be arranged on the upstream side or on the downstream side from the central axes of the second support rollers 52, or may be arranged at the position which is the same as the central axes of the second support rollers 52. In the present embodiment, two second rotation shafts 32 are provided. These second rotation shafts 32 are arranged in such a manner that the first component part 15 is arranged between the two second rotation shafts 32 in the width direction D2.

As described above, the extension direction of the first rotation shaft 31 and the extension direction of each of the second rotation shafts 32 are different from each other; therefore, of the plurality of string-shaped supports 23 forming the second component parts 16, the alignment direction of the parts which are wound around and supported by the first rotation shaft 31 is different from the alignment direction of the parts which are wound around and supported by the second rotation shafts 32. Specifically, of the plurality of string-shaped supports 23 forming the second component parts 16, the alignment direction of the parts wound around and supported by the first rotation shaft 31 is a horizontal direction (in particular, the width direction D2), and the alignment direction of the parts wound around and supported by the second rotation shafts 32 is the height direction D3.

The traveling direction of each of the string-shaped supports 23 forming the second component parts 16 is reversed at the rotation shafts which each string-shaped support 23 is wound around and supported by. For example, the plurality of string-shaped supports 23 forming the second component parts 16 arranged on the upstream side from the first conveyance area A1 travel from the rotation shaft arranged on the upstream from the conveyance rotation shaft 33 towards the conveyance rotation shaft 33, are reversed at the conveyance rotation shaft 33, travel from the conveyance rotation shaft 33 toward the rotation shaft arranged on the upstream, are reversed at the rotation shaft arranged on the upstream, and travel from the upstream side toward the downstream side again. Similarly, the string-shaped supports 23 of the second rotation shafts 32 which are wound around and supported by the first rotation shaft 31 and each of the second rotation shafts 32 travel from the first rotation shaft 31 toward the corresponding second rotation shaft 32, are reversed at the corresponding second rotation shaft 32, travels from the corresponding second rotation shaft 32 toward the first rotation shaft 31, and are reversed at the first rotation shaft 31 and travel from the upstream side to the downstream side again.

Therefore, the support portions of the second component parts 16 which make contact with the bending portions 87 of a skin 81 are formed by portions of a plurality of string-shaped supports 23 traveling from the upstream side toward the downstream side which make contact with the skin 81.

In this way, the arrangement of the plurality of string-shaped supports 23 in each of the first conveyance area A1 and the second conveyance area A2 is adjusted in such a manner that the angle formed by the support portion of a second component part 16 with respect to the support portion of the first component part 15 continuously changes from the first conveyance area A1 toward the second conveyance area A2.

Here, the "angle formed by the support portion of a second component part 16 with respect to the support portion of the first component part 15" is, for example, the angle formed by the entire of the portions of the plurality of string-shaped supports 23 forming a second component part 16 which make contact with a skin 81 (in particular, the portions aligned in the width direction D2) with respect to the entire of the portions of the plurality of string-shaped supports 23 forming the first component part 15 which make contact with the skin 81 (in particular, the portions aligned in the width direction D2). The cases where the angle changes continuously are cases where the angle changes smoothly and excludes cases where the angle changes suddenly. The cases where the angle changes continuously may include not only cases where the angle changes successively but also cases where there is a partial section where the angle does not change. Therefore, the section between the first conveyance area A1 and the second conveyance area A2 is configured by only a section in which the "angle formed by the support portion of a second component part 16 with respect to the support portion of the first component part 15" changes or may be configured by both a section in which the angle changes and a section in which the angle does not change.

Specifically, of the plurality of string-shaped supports 23 forming the second component parts 16, a string-shaped support 23 arranged farther in the horizontal direction (in particular, in the width direction D2) from the bending reference portions 85 at the first conveyance area A1 (specifically, a string-shaped support 23 arranged farther from the corresponding support unit 13) is arranged at a higher position in the height direction D3 at the second conveyance area A2 (specifically, at the corresponding second rotation shaft 32).

In this way, the plurality of string-shaped supports 23 of the second component parts 16, which are the means for raising the respective bending portions 87 of a skin 81, are arranged so as to spread in a horizontal direction (in particular, the width direction D2) on the first rotation shaft 31 and are arranged so as to spread in the height direction D3 on the second rotation shafts 32. Therefore, the plurality of string-shaped supports 23 forming the second component parts 16 are in a twisted state between the first conveyance area A1 and the second conveyance area A2.

According to the conveyance unit 11 having the above-described configuration, the angle formed by the support portion of a second component part 16, which makes contact with a bending portion 87, with respect to the support portion of the first component part 15, which makes contact with the base portion 86, continuously changes little by little from the first conveyance area A1 toward the second conveyance area A2, and thus the angle of a bending portion 87 with respect to the base portion 86 in the second conveyance area A2 becomes larger than the angle of the bending portion 87 with respect to the base portion 86 in the first conveyance area A1. Specifically, the angle formed by a bending portion 87 in the second conveyance area A2 with respect to the horizontal plane is larger than the angle formed by the bending portion 87 in the first conveyance area A1 with respect to the horizontal plane.

Thus, as a work W (i.e., a skin 81 and an ingredient 82) advances from the first rotation shaft 31 toward the second rotation shafts 32, both end portions (that is, the bending portions 87) of the skin 81 are supported and are gradually raised to higher positions by the second component parts 16. Then, both end portions of the skin 81 reach the highest positions when the work W reaches the second conveyance area A2, which is a position corresponding to the second rotation shafts 32. In this way, both end portions of the skin 81 are raised by the raising means, so that the skin 81 can be neatly folded by the wrapping mechanism 73 provided in the subsequent stage (see FIG. 1D).

[Support Unit]

The support units 13 support the bending reference portions 85, which are parts of a skin 81, in at least a part of the section while the skin 81 is conveyed from the first conveyance area A1 to the second conveyance area A2. The support units 13 of the present embodiment are brought into contact with the bending reference portions 85, which are parts of a skin 81, while at least the skin 81 is conveyed from the first conveyance area A1 to the second conveyance area A2. In this situation, the bending reference portions 85 are arranged between the conveyance unit 11 and the support units 13, but the bending reference portions 85 may not or may substantially receive a force in the height direction D3 from the support units 13. In a case where the bending reference portions 85 receive a force from the support units 13 in the height direction D3, the bending reference portions 85 are sandwiched between the conveyance unit 11 and the support units 13 to effectively prevent the bending reference portions 85 from being displaced in the horizontal direction. Two support units 13 in the present embodiment are provided. The two support units 13 slightly press the respective bending reference portions 85 existing at two positions of a skin 81, against the conveyance unit 11.

Each support unit 13 has a first support roller 51, a relay guide unit 53, a second support roller 52, and a support moving body 54.

The first support roller 51 forms the upstream end portion of a support unit 13, the second support roller 52 forms the downstream end portion of a support unit 13, and the relay guide unit 53 is provided between the first support roller 51 and the second support roller 52. The support moving body 54 has an endless shape and is wound around and supported by the first support roller 51, the relay guide unit 53 and the second support roller 52, and travels in accordance with the axial rotation of each of the first support roller 51 and the second support roller 52.

A common first support shaft 34 extending in the width direction D2 is fixed to the two first support rollers 51 provided at positions where the two first support rollers 51 are separated from each other in the width direction D2. The first support shaft 34 is arranged on the center axis of each of the first support rollers 51. Further, a common second support shaft 35 extending in the width direction D2 is fixed to the two second support rollers 52 provided at positions where the two second support rollers 52 are separated from each other in the width direction D2. The second support shaft 35 is arranged on the center axis of each of the second support rollers 52. The two first support rollers 51 jointly rotate, together with the first support shaft 34, around the center axis. Further, the two second support rollers 52 jointly rotate, together with the second support shaft 35, around the center axis.

In each support unit 13, by causing at least one of the first support roller 51 and the second support roller 52 to perform the axial rotation, the support moving body 54 travels along the outer circumferences of the first support roller 51, the relay guide unit 53 and the second support roller 52. In particular, at least one of the first support roller 51 and the second support roller 52 is driven in such a manner that the part of the support moving body 54 facing the conveyance unit 11 (that is, the part located below the first support roller 51, the relay guide unit 53 and the second support roller 52) travels from the upstream side toward the downstream side (specifically, from the first support roller 51 toward the second support roller 52).

In this way, each support unit 13 has a string-shaped support moving body 54 which travels from the first conveyance area A1 toward the second conveyance area A2 while being in contact with the corresponding bending reference portion 85.

As described above, a pair of support units 13 comprising four front right, front left, back right and back left rollers (that is, the two first support rollers 51 and the two second support rollers 52) is provided above the conveyance means (i.e., the conveyance unit 11) which conveys a work W (i.e., a skin 81 and an ingredient 82). Further, a raising means (that is, the second component parts 16) for raising end portions (that is, the bending portions 87) of a skin 81 of a work W is provided outside each support unit 13 in the width direction D2.

The bending mechanism 72 further includes other necessary equipment.

For example, a trigger sensor 37 capable of detecting the passage of a skin 81 at an arbitrary position on the conveyance path of a skin 81 (a work W) may be provided. FIGS. 15 to 23 illustrate a trigger sensor 37 provided between the first conveyance area A1 and the second conveyance area A2 as an example. Above the conveyance unit 11 (in particular, the string-shaped supports 23), this trigger sensor 37 is attached to a third support shaft 36 extending in the width direction D2. This trigger sensor 37 is capable of detecting the passage of a skin 81 at a position directly below (that is, an intermediate position between the first conveyance area A1 and the second conveyance area A2). The trigger sensor 37 may be installed at another position to detect the passage of a skin 81 at another position on the conveyance path. The trigger sensor 37 can be configured by an arbitrary device such as a photo sensor and transmits the detection results to a control unit 40 (see FIG. 15).

Figure 24:
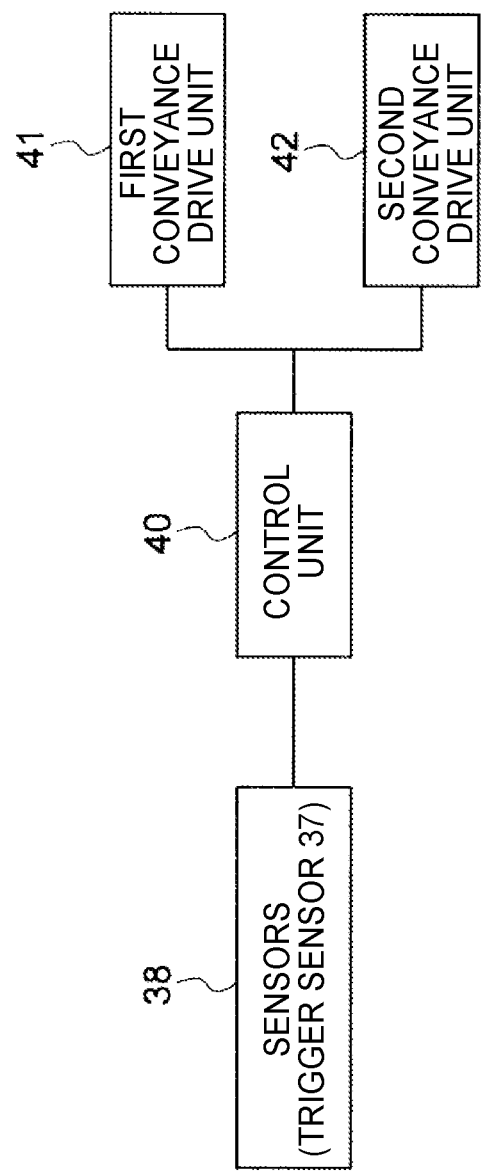
FIG. 24 is a block diagram showing an example of a functional configuration of a control unit.

FIG. 24 is a block diagram showing an example of the functional configuration of the control unit 40. Sensors 38 (for example, a trigger sensor 37), a first conveyance drive unit 41 and a second conveyance drive unit 42 are connected to the control unit 40 illustrated in FIG. 24. The control unit 40 may be connected to devices which are not illustrated in FIG. 24.

Further, the control unit 40 also controls the drive of the conveyance unit 11 (the string-shaped supports 23, the conveyance body 28) in the bending reference portion formation mechanism 71. Moreover, the control unit 40 may control a power generator (not shown) which rotationally drives the rotation shaft member 30 (see FIGS. 5 to 13) of the bending reference portion formation mechanism 71.

The first conveyance drive unit 41 drives the first component part 15 under the control of the control unit 40. The second conveyance drive unit 42 drives the second component parts 16 under the control of the control unit 40. In the illustrated bending mechanism 72, at least one of the rotation shafts which the plurality of string-shaped supports 23 forming the first component part 15 are wound around and supported by is rotated by the first conveyance drive unit 41. Further, at least one of the first rotation shaft 31 and each of the second rotation shafts 32 is rotated by the second conveyance drive unit 42. Further, at least one of the conveyance rotation shaft 33 and the upstream rotation shaft (not shown) which the plurality of string-shaped supports 23 forming the second component parts 16 are wound around and supported by is rotated by the second conveyance drive unit 42. Each of the first conveyance drive unit 41 and the second conveyance drive unit 42 may include one or more drive devices, and such drive devices may be configured by arbitrary power generators such as motors.

Each of the string-shaped supports 23 forming the first component part 15 is wound around and supported by each of the third rotation shaft 48 and a rotation shaft, which is not illustrated, in an arbitrary form in such a manner that its traveling position does not shift from the predetermined position in the width direction D2. Similarly, each of the string-shaped supports 23 forming the second component parts 16 is also wound around and supported by each of the upstream rotation shaft (not shown), the conveyance rotation shaft 33, and the first rotation shaft 31 and the second rotation shafts 32 in an arbitrary form in such a manner that its traveling position does not shift from the predetermined position. Typically, a plurality of grooves (not shown) are formed on each rotation shaft and corresponding string-shaped supports 23 are wound around and supported by the respective grooves, so that each string-shaped support 23 can travel while the displacement of each string-shaped support 23 is prevented.

In reality, each string-shaped support 23 travels while being supported by the rotation shafts under the effect of the tension acting on each string-shaped support 23, the traveling speed of each string-shaped support 23, and other influences. In particular, regarding the plurality of string-shaped supports 23 (the second component parts 16) wound around and supported by the first rotation shaft 31 and the second rotation shafts 32, the actual travel distance between the first rotation shaft 31 and the second rotation shafts 32, the actual travel direction, the actual tension are not always the same among the string-shaped supports 23, and if the first rotation shaft 31 and the second rotation shafts 32 have a simple support structure, the string-shaped supports 23 easily fall off from the first rotation shaft 31 and/or the second rotation shafts 32. Actually, in devices prototyped by the inventors of the present invention, in a case where the second rotation shafts were configured by shafts in which a plurality of grooves were formed, each string-shaped support 23 fell off from a corresponding groove with the passage of time. Therefore, it is preferable that the second rotation shafts 32 should have a structure effective for preventing each string-shaped support 23 from falling off. As an example, the second rotation shafts 32 may have a plurality of winding parts (not shown), and the plurality of winding parts may be provided independently of each other and may support, without receiving substantial influences from each other, the corresponding plurality of string-shaped supports 23 while the plurality of string-shaped supports 23 can travel freely. The inventors of the present invention made the second rotation shafts 32 by alternately and repeatedly arranging two types of bearings having different diameters and inserting a shaft into these bearings, and the string-shaped supports 23 were wound around and supported by the respective bearings having a relatively smaller diameter. In this case, each bearing can rotate independently around the shaft without being affected by other bearings, and each string-shaped support 23 is arranged between bearings having a relatively larger diameter. When the bending mechanism 72 including the second rotation shafts 32 was operated, each of the string-shaped supports 23 could stably travel on a predetermined track for a long time without falling off from the second rotation shafts 32.

Also, a device which promotes the movement of a work W (that is, a skin 81 and an ingredient 82) from the bending mechanism 72 to the wrapping mechanism 73 is further provided. The device which transfers a work W from the bending mechanism 72 to the wrapping mechanism 73 can be configured by a general device, and the detailed description of a specific example thereof will be omitted. Such a device which transfers a work W from the bending mechanism 72 to the wrapping mechanism 73 may be driven under the control of the control unit 40 and may be controlled, for example, according to the detection results of the trigger sensor 37 illustrated in FIGS. 15 to 23.

[Bending Method]

Next, the entire flow of a method of raising the bending portions 87 by the bending mechanism 72 having the above-described configuration to bend a skin 81 will be described. The bending method described below is carried out under the control of the control unit 40 (see FIG. 24) and includes a step of conveying a skin 81 (i.e., a work W) by the conveyance unit 11 so as to pass through the second conveyance area A2 after passing through the first conveyance area A1.

Figure 18:
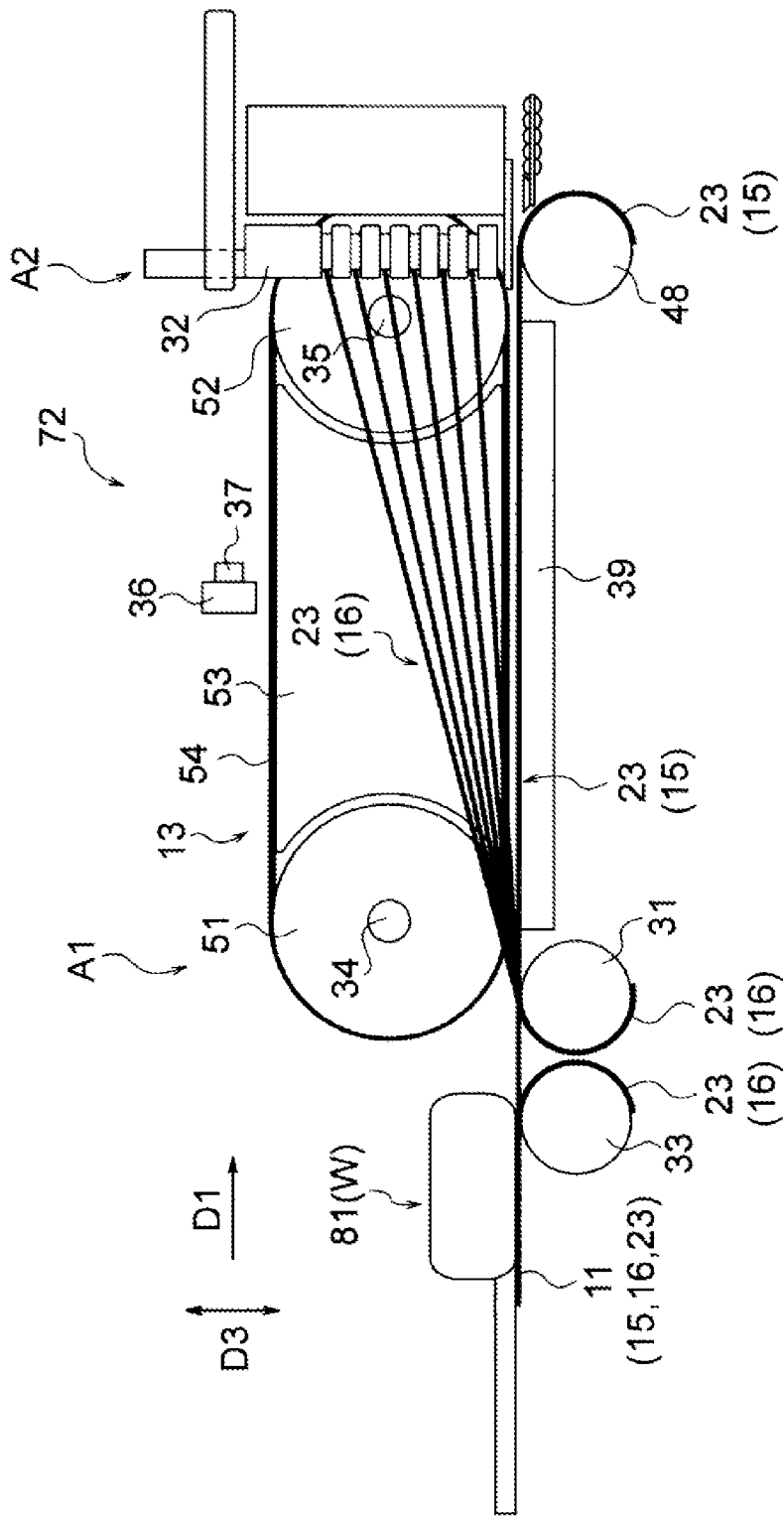
FIG. 18 is a side view of a bending mechanism.

Specifically, first, a work W (i.e., a skin 81 and an ingredient 82) is conveyed, by the conveyance unit 11, to a place which is located on the upstream side from the first conveyance area A1 (see FIGS. 15 and 18). At this stage, the bending reference portions 85 have been already given to the skin 81 by the bending reference portion formation mechanism 71 (see FIG. 4).

Figure 19:
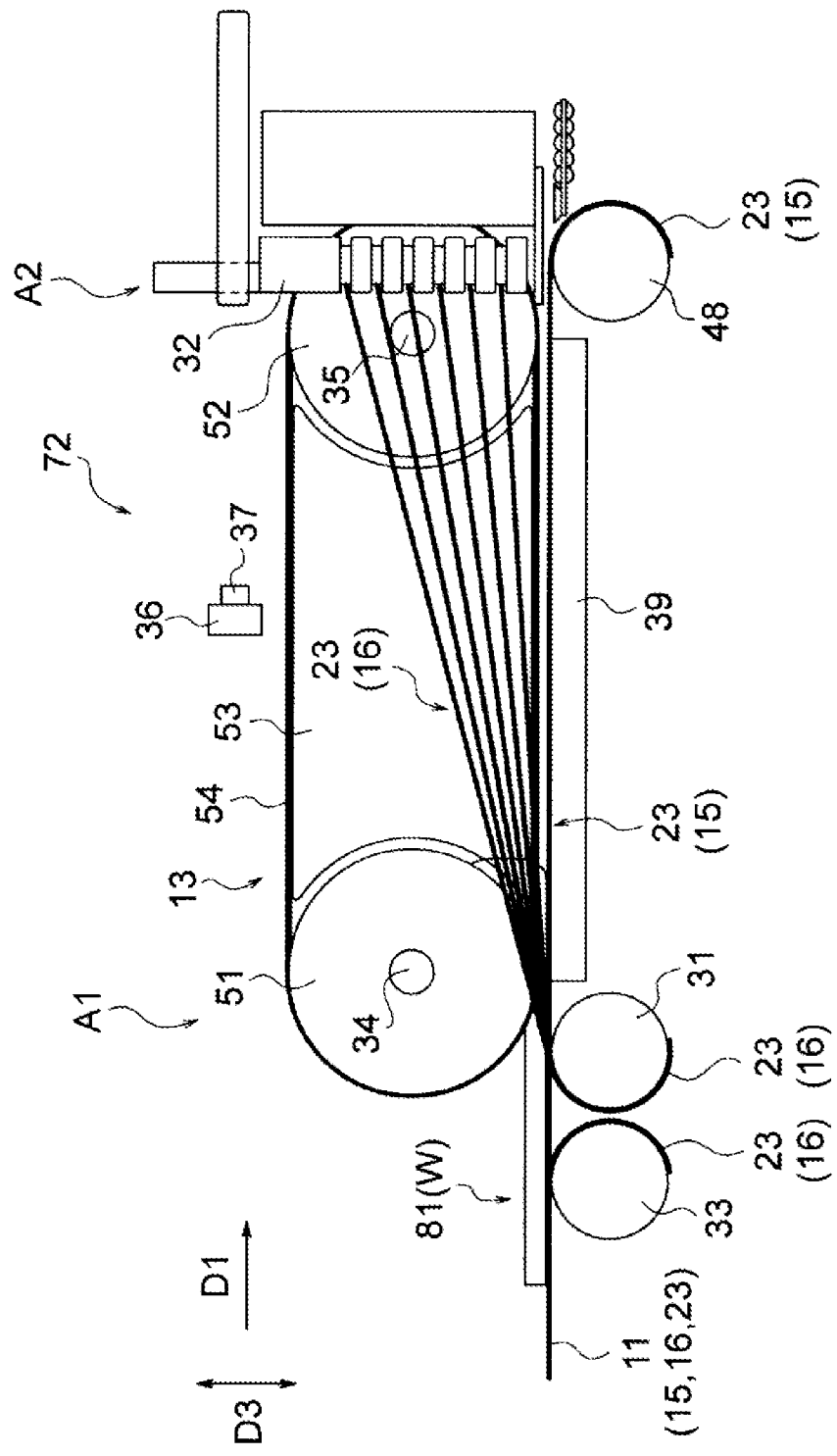
FIG. 19 is a side view of a bending mechanism.

Then, the work W is sent further downstream by the conveyance unit 11 and enters below the first support rollers 51 of the respective support units 13 (see FIG. 19). At this stage, the support moving bodies 54 wound around and supported by the respective first support rollers 51 come into contact with the corresponding bending reference portions 85 to slightly press the bending reference portions 85 (that is, the skin 81) against the conveyance unit 11 from above.

Figure 20:
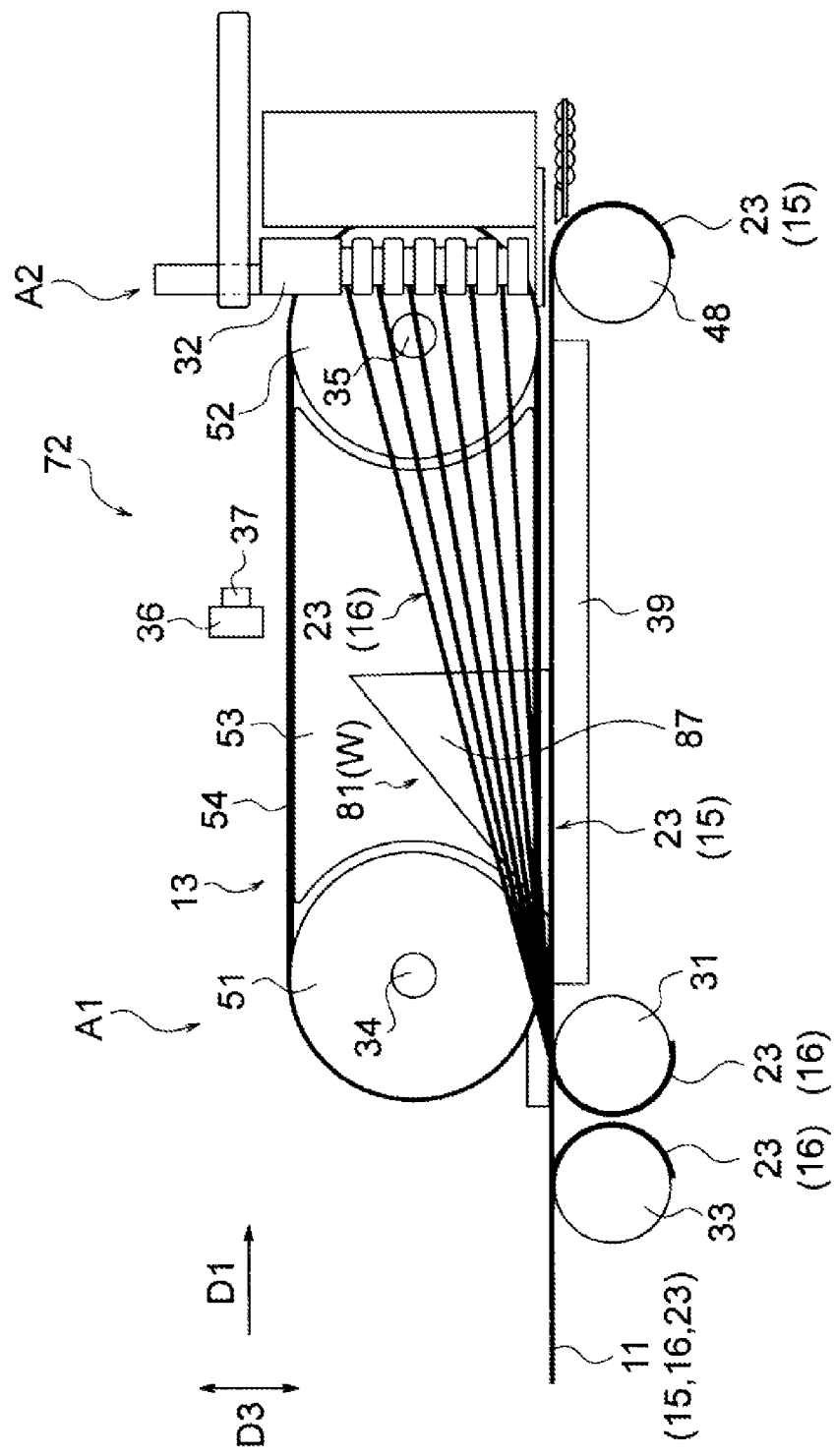
FIG. 20 is a side view of a bending mechanism.
Figure 21:
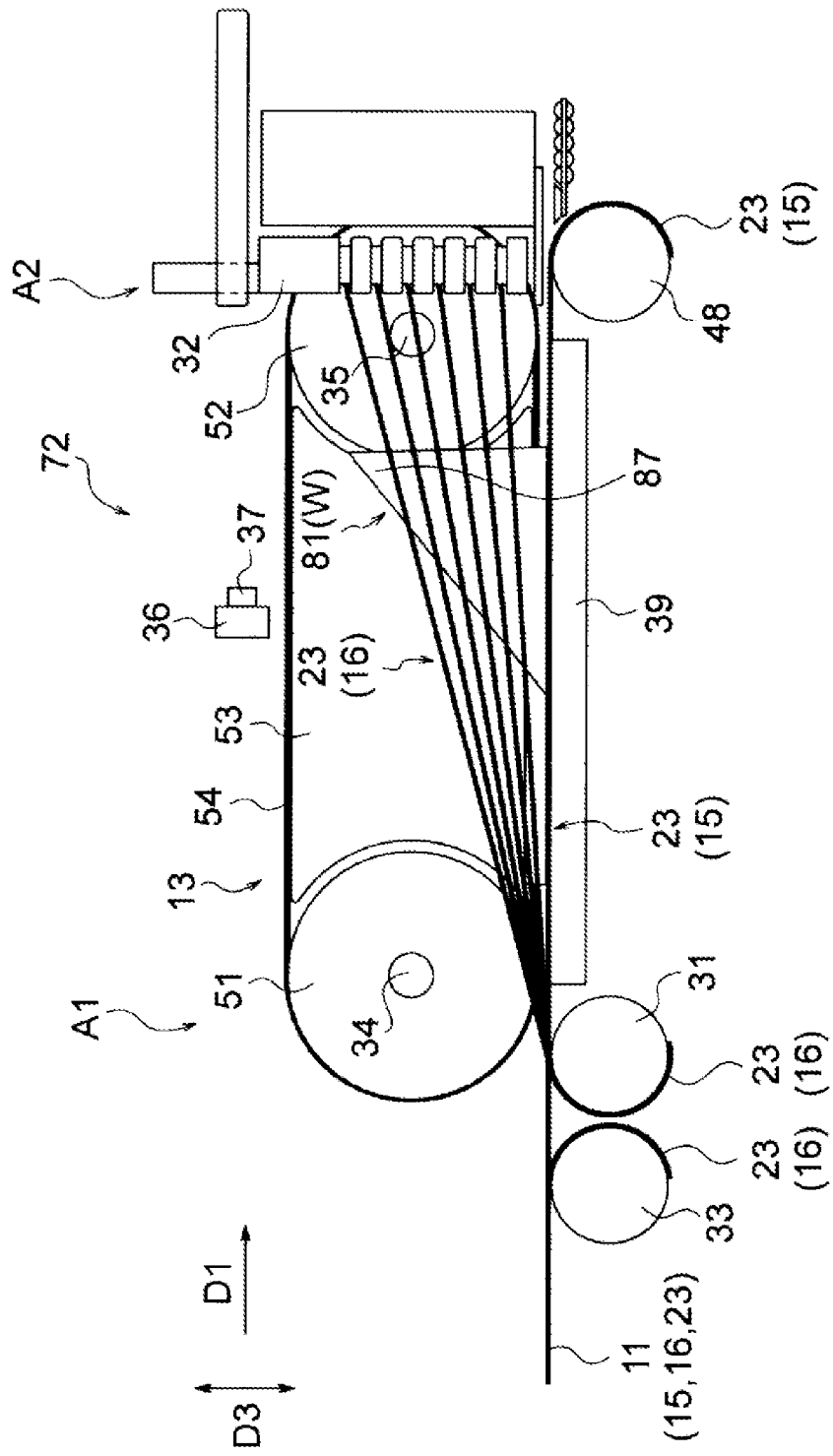
FIG. 21 is a side view of a bending mechanism.

Then, the work W is sent from the first conveyance area A1 toward the second conveyance area A2 as the string-shaped supports 23 and the support moving bodies 54 travel in the conveyance direction D1 (see FIGS. 16, 20 and 21). At this stage, the bending portions 87 of the skin 81 are gradually raised by the corresponding second component parts 16 in such a manner that the skin 81 is bent with reference to the bending reference portions 85. Further, when the work W passes through the detection position of the trigger sensor 37, the passage of the work W is detected by the trigger sensor 37 (see FIGS. 20 and 21).

Figure 22:
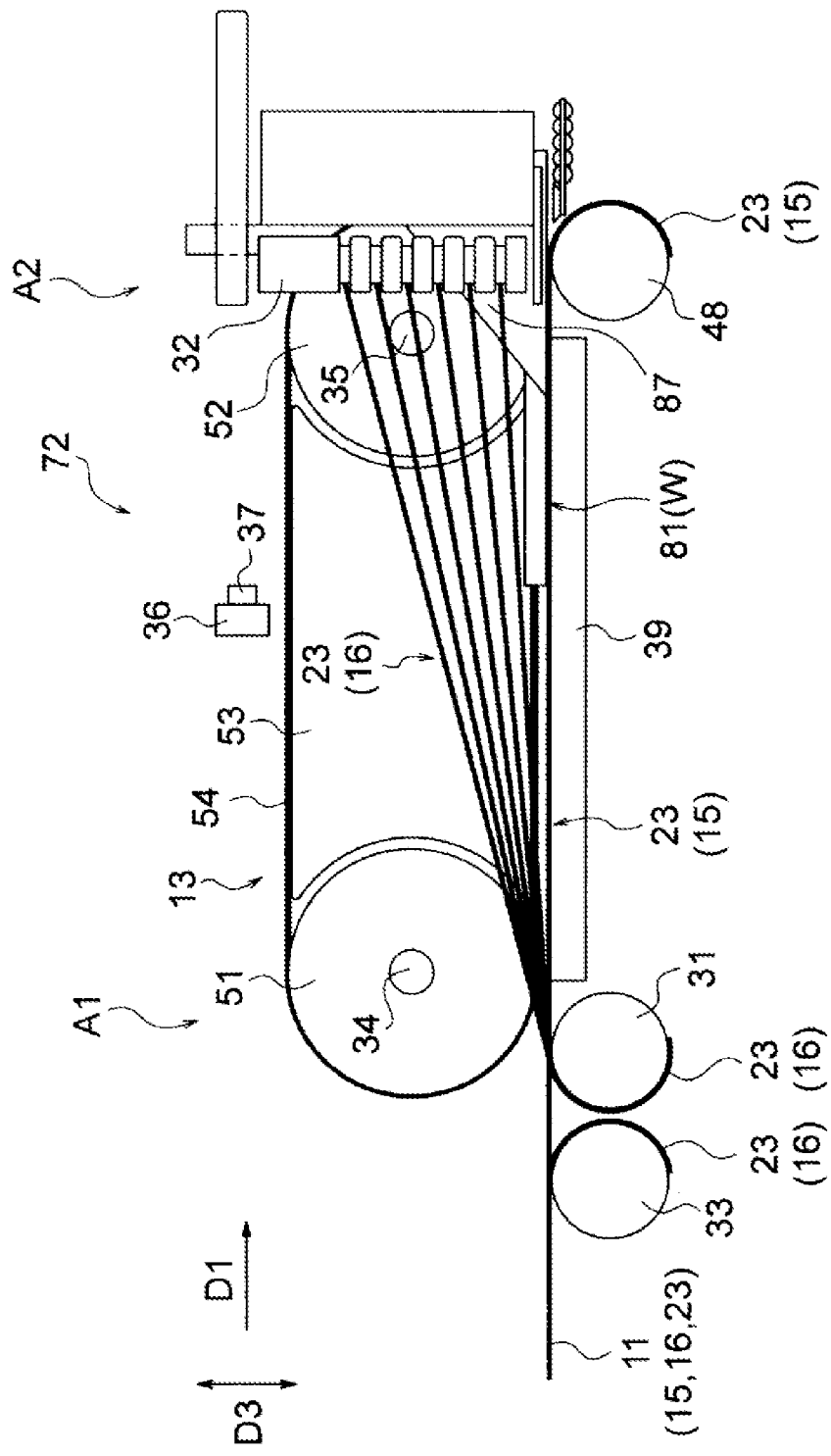
FIG. 22 is a side view of a bending mechanism.
Figure 23:
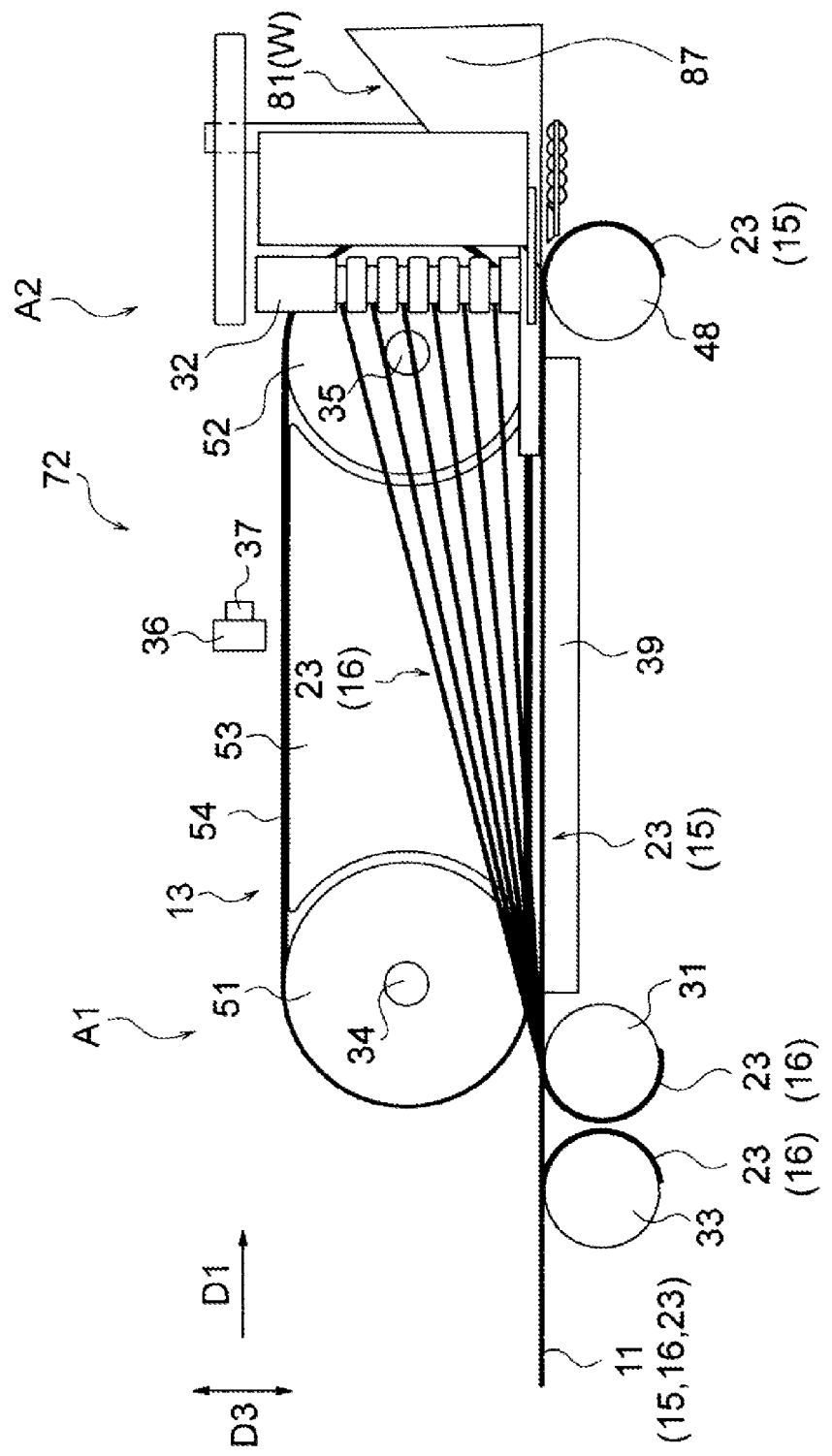
FIG. 23 is a side view of a bending mechanism.

Then, the work W is sent further downstream by the conveyance unit 11 and reaches the second conveyance area A2 (see FIGS. 17 and 22). The alignment direction of the plurality of string-shaped supports 23 forming the second component parts 16 at the position where the plurality of string-shaped supports 23 are wound around and supported by the second rotation shafts 32 is closest to the direction along the height direction D3. Therefore, at the position where the work W passes between the second rotation shafts 32, each bending portion 87 of the skin 81 extends generally in the height direction D3.

Then, the work W moved downstream from the second conveyance area A2 is sent to the wrapping mechanism 73 (see FIG. 4). Then, the skin 81 of the work W is folded by the wrapping mechanism 73, so that both end portions (that is, the two bending portions 87) of the skin 81 are placed on the ingredient 82 (see FIG. 1D).

As described above, according to the bending mechanism 72 and the bending method of the present embodiment, the bending portions 87 of a skin 81 can be raised reliably and stably, and the skin 81 can be bent with high accuracy and high speed. In particular, according to the bending mechanism 72 of the present embodiment, by moving the whole of a work W (i.e., a skin 81 and an ingredient 82) in the horizontal direction without moving the whole of the work W in the height direction D3, only the bending portions 87 of the skin 81 can be raised in the height direction D3. Therefore, a plurality of works W can be continuously conveyed at high speed and in a smooth manner, and it is possible to prevent an impact force from acting on the works W and keep the works W in a desired shape. Further, since the bending portions 87 are gradually raised as a skin 81 advances in the conveyance direction D1, the skin 81 can be reliably and neatly bent in a natural manner, and defects such as scratching of the bending portions 87 are unlikely to occur. As described above, according to the bending mechanism 72 of the present embodiment, by conveying a skin 81 from the first conveyance area A1 toward the second conveyance area A2, the bending portions 87 of the skin 81 are guided by the string-shaped supports 23 of the second component parts 16 so as to be naturally and smoothly raised in a passive manner. Further, a dedicated member and a dedicated power source for bending a skin, as used in the above-mentioned conventional device, are not required, and a skin 81 is not actively bent by such a dedicated member and therefore it is possible to prevent an excessively large force from acting on a skin 81 and bend a skin 81 appropriately and gently.

In contrast, in a device and a method where the whole of a work W needs to be moved in the height direction D3 in order to raise the bending portions 87 of the skin 81, the movement in the conveyance direction D1 of the work W is necessary to be stopped in order to move the work W in the height direction D3. Thus, the high-speed and smooth conveyance of a work W is hindered. Further, when a work W is moved in the height direction D3, a corresponding impact force is likely to act on the work W, and thus defects, such as displacement and shape loss of the skin 81, are likely to occur. Further, when a work W is moved in the height direction D3 to rapidly raise the bending portions 87 of the skin 81, the skin 81 might be torn or the bending portions 87 might be caught in the device. In particular, as the overall processing speed (for example, the conveyance speed of a work W) is increased, the occurrence of such defects tends to become more prominent.

Further, since the bending mechanism 72 of the present embodiment has a configuration which moves a work W in the horizontal direction only, the connectivity to other devices is excellent. Therefore, the bending mechanism 72 can be designed and installed relatively freely according to the installation mode of other devices provided on the upstream side and the downstream side, and the space-saving design of the bending mechanism 72 is also possible.

Further, the bending mechanism 72 of the present embodiment is able to address works W of various sizes and is excellent in versatility. For example, it is possible to use the same bending mechanism 72 for works W (in particular, skins 81) having a size of approximately 60 mm to 120 mm in the width direction D2.

Application Examples

The bending reference portion formation mechanism 71, the bending mechanism 72, the bending reference portion formation method and the bending method described above can be applied to various food manufacturing apparatuses, food manufacturing systems and food manufacturing methods. For example, a food manufacturing method can manufacture various foods by using a sheet-shaped flexible food material (a skin 81 of a work W) in which a bending reference portion 85 is formed by the above-mentioned food material processing method using the bending reference portion formation mechanism 71.

For example, skins used for burritos, tacos, crepes or other wrap foods (in other words, foods in which an ingredient is wrapped in a skin) can be suitably bent by the apparatus and the method described above. The ingredients which can be placed on a skin are not limited, and the ingredients may include, for example, solid food materials, liquid food materials, viscous food materials (such as a special sauce called Tare in Japanese, sauce and cream), foaming food materials (such as whipped cream), and a mixture thereof. Further, an object other than the food materials may be placed on a skin, and for example, a solid tool, a sheet, a liquid material and a gel material which are not food materials may be placed on a skin. Moreover, a skin used for a food (for example, an egg roll) which contains only the skin and does not contain an ingredient can be also suitably bent by the apparatus and the method described above. In addition, sheet-shaped flexible food materials other than skins can be also suitably bent by the apparatus and the method described above. The components, the shapes and the sizes (specifically, the planar size and the thickness) of such sheet-shaped flexible food materials are not limited in particular.

In this way, the food manufacturing system may include the above-mentioned bending reference portion formation mechanism 71, the above-mentioned bending mechanism 72 which bends a skin 81 with reference to a bending reference portion 85, and the above-mentioned wrapping mechanism 73 which further folds a skin 81 bent by the bending mechanism 72. Further, a food material manufacturing method may use a skin 81 in which a bending reference portion 85 has been formed by the above-described method and which has been folded.

Figure 25:
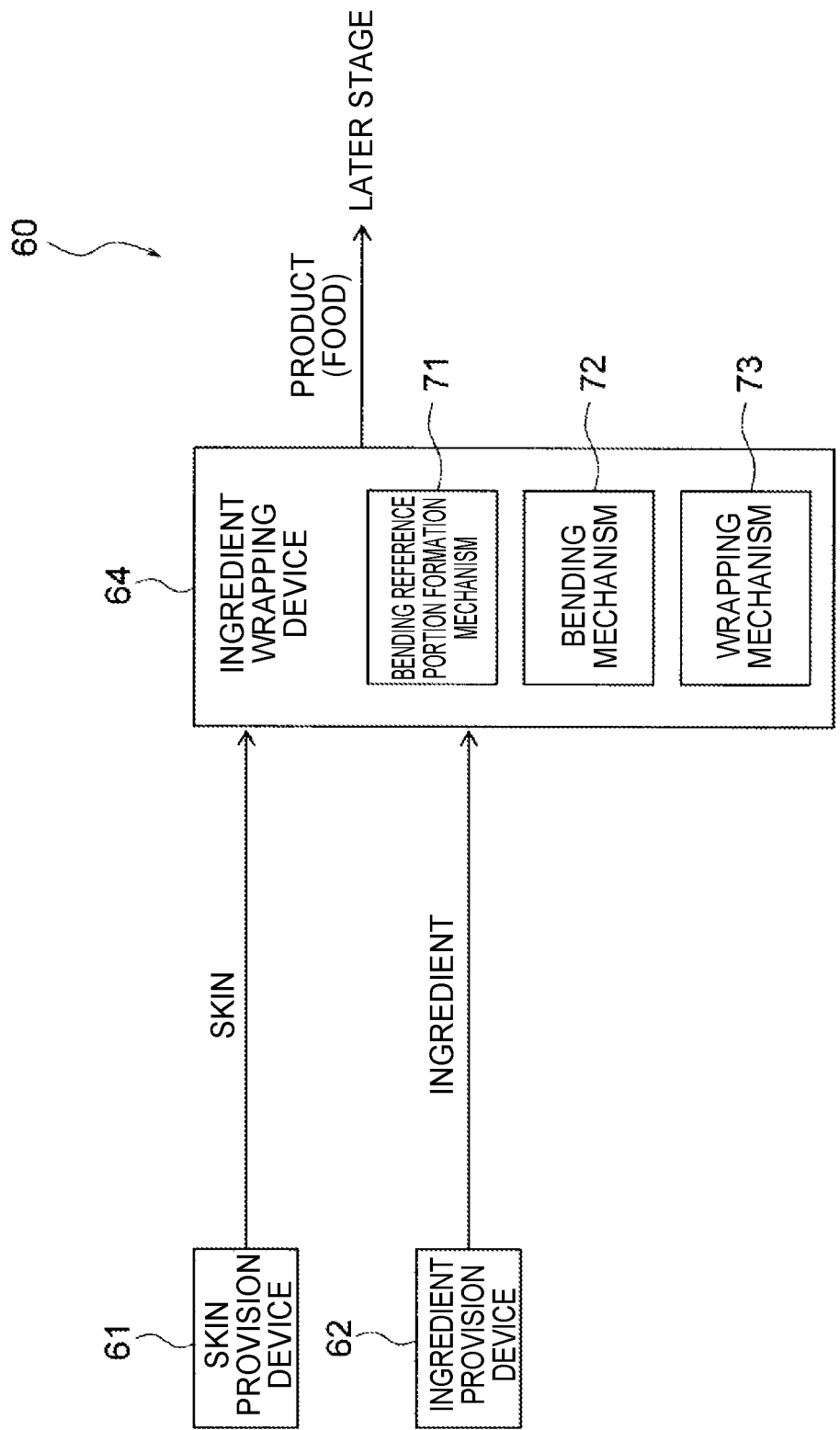
FIG. 25 is a block diagram showing an example of a food manufacturing system.

FIG. 25 is a block diagram showing an example of a food manufacturing system 60. The food manufacturing system 60 illustrated in FIG. 25 comprises a skin provision device 61 and an ingredient provision device 62 in addition to an ingredient wrapping device 64 including the bending reference portion formation mechanism 71, the bending mechanism 72 and the wrapping mechanism 73 described above.

The skin provision device 61 is a device which prepares a skin for wrapping an ingredient, and a prepared skin is sent from the skin provision device 61 to the ingredient wrapping device 64 by a transportation device such as a conveyor. The specific configuration and function of the skin provision device 61 are not limited. For example, the skin provision device 61 may perform manufacturing and shaping (such as cutting) of a skin, may perform only shaping of a skin which is manufactured in advance, or may simply send a skin which is shaped in advance, in a desired state, toward the ingredient wrapping device 64. Further, the skin provision device 61 may perform other processes and, for example, may perform various pretreatments on a skin.

The ingredient provision device 62 is a device which prepares an ingredient (for example, a paste-like food material) to be wrapped in a skin, and a prepared ingredient is sent from the ingredient provision device 62 to the ingredient wrapping device 64 by a transportation device such as a conveyor. The specific configuration and function of the ingredient provision device 62 are not limited. For example, the ingredient provision device 62 may perform cutting and mixing of an ingredient, may only mix an ingredient that is cut in advance, or may simply send an ingredient which is mixed in advance, in a desired state, toward the ingredient wrapping device 64. Further, the ingredient provision device 62 may perform other processes and, for example, may perform various pretreatments on an ingredient.

The ingredient wrapping device 64 performs a process of wrapping a quantitated ingredient sent from the ingredient provision device 62 with a skin sent from the skin provision device 61 to manufacture a product (a food) (see FIGS. 1A to 1F). On this occasion, a skin is bent by the bending reference portion formation mechanism 71, the bending mechanism 72 and the wrapping mechanism 73 in accordance with the above-mentioned method. Specifically, the ingredient wrapping device 64 may comprise the bending reference portion formation mechanism 71, the bending mechanism 72 and the wrapping mechanism 73 described above. Then, a product (i.e., a food such as a spring roll 80 (see FIG. 1F)) produced by the ingredient wrapping device 64 is sent to a subsequent stage by a transportation device such as a conveyor, and various processes are performed in the subsequent stage as needed.

The food manufacturing system 60 illustrated in FIG. 25 is only an example, and in the food manufacturing system 60, any device may be combined with the bending reference portion formation mechanism 71 and/or the bending mechanism 72 described above. Further, in the food manufacturing method, any process may be combined with the above-mentioned food material processing method. For example, in a food manufacturing system 60 and a food manufacturing method which manufacture a food which does not require an ingredient, the ingredient provision device 62 is unnecessary. Further, in cases where an ingredient is manually supplied directly to the ingredient wrapping device 64, the ingredient provision device 62 is unnecessary.

As described above, according to a food manufacturing system 60 comprising the bending mechanism 72 of the present embodiment, the bottleneck of the process which can be caused by the bending mechanism 72 can be improved, a large number of rolled foods can be continuously and stably manufactured at high speed and in a smooth manner, and the productivity can be improved.

The present invention is not limited to the above-described embodiments and variant examples. For example, various modifications may be added to each element of the above-described embodiments and variant examples. In addition, embodiments comprising components and/or methods other than the above-mentioned components and/or methods are also included in the embodiments of the present invention. Further, embodiments which do not comprise a part of the above-mentioned components and/or methods are also included in the embodiments of the present invention. Moreover, embodiments comprising some components and/or methods included in certain embodiments of the present invention and some components and/or methods included in other embodiments of the present invention are also included in the embodiments of the present invention. Therefore, components and/or methods included in the above-described embodiments, the above-described variant examples, and embodiments of the present invention which are not described above may be combined with each other, and embodiments related to such combinations are also included in the embodiments of the present invention. Further, the effects produced by the present invention is not limited to the above-mentioned effects, and a particular effect according to the specific configuration of each embodiment can be exhibited. As described above, various additions, modifications and partial deletions may be made to each element described in the claims, the specification, the abstract and the drawings without departing from the technical idea and purpose of the present invention.

REFERENCE SIGNS LIST

11 Conveyance unit
12 Processing unit
13 Support unit
15 First component part
16 Second component part
21 Reference formation unit
22 Pressing unit
23 String-shaped support
24 Reference pressing unit
25 Reference roller
26 Pressing roller
28 Conveyance body
30 Rotation shaft member
31 First rotation shaft
32 Second rotation shaft 33 Conveyance rotation shaft
34 First support shaft
35 Second support shaft
36 Third support shaft
37 Trigger sensor
38 Sensors
39 Moving body guide
40 Control unit
41 First conveyance drive unit
42 Second conveyance drive unit
48 Third rotation shaft
51 First support roller
52 Second support roller
53 Relay guide unit
54 Support moving body
60 Food manufacturing system
61 Skin provision device
62 Ingredient provision device
64 Ingredient wrapping device
71 Bending reference portion formation mechanism
72 Bending mechanism
73 Wrapping mechanism
80 Spring roll
81 Skin
82 Ingredient
85 Bending reference portion
86 Base portion
87 Bending portion
A1 First conveyance area
A2 Second conveyance area
C1 First vertex
C2 Second vertex
C3 Third vertex
C4 Fourth vertex
D1 Conveyance direction
D2 Width direction
D3 Height direction
S1 Preparation step
S2 First folding step
S3 Second folding step
S4 Third folding/fourth folding step
S5 Fifth folding step
S6 Sixth folding step
S11 Bending reference portion formation step
S12 Bending step
S13 Wrapping step
W Work

The invention claimed is:

1. A food material processing mechanism comprising:
a conveyer which conveys a sheet-shaped flexible food material in a conveyance direction; and
a processing unit which forms a bending reference portion being a reference portion for bending, in the flexible food material being conveyed by the conveyer,
wherein the processing unit includes:
a reference formation unit which includes a reference roller configured to rotate while the reference roller is in contact with the flexible food material being conveyed by the conveyor so that the reference roller locally applies a force to the flexible food material to form the bending reference portion; and
a pressing unit which includes a pressing roller configured to rotate while the pressing roller is in contact with the flexible food material being conveyed by the conveyer so that the pressing roller presses the flexible food material against the conveyer at least temporarily while the reference roller forms the bending reference portion in the flexible food material, wherein a center axis of rotation of the reference roller and a center axis of rotation of the pressing roller are arranged on a same straight line.

2. The food material processing mechanism as defined in claim 1, wherein the reference formation unit is smaller than the pressing unit with respect to a width direction perpendicular to the conveyance direction.

3. The food material processing mechanism as defined in claim 1, wherein:
the conveyer includes a conveyance body on which the flexible food material is placed and which travels in the conveyance direction.

4. The food material processing mechanism as defined in claim 1, wherein a maximum value of a pressure applied to the flexible food material by the reference roller is larger than a maximum value of a pressure applied to the flexible food material by the pressing roller.

5. The food material processing mechanism as defined in claim 1, wherein the reference formation unit includes two or more said reference rollers so that the reference formation unit locally applies a force to two or more parts of the flexible food material which are separated from each other in a width direction perpendicular to the conveyance direction.

6. The food material processing mechanism as defined in claim 1, wherein a diameter of the reference roller is larger than a diameter of the pressing roller.

7. The food material processing mechanism as defined in claim 1, wherein the plurality of pressing rollers are provided and at least two or more of the plurality of pressing rollers are arranged at positions where the at least two or more of the plurality of pressing rollers are separated from each other in a width direction perpendicular to the conveyance direction.

8. The food material processing mechanism as defined in claim 7, wherein:
the plurality of pressing rollers includes a first pressing roller and a second pressing roller which are arranged at positions where the first pressing roller and the second pressing roller are separated from each other in the width direction, and
the plurality of the reference rollers are provided, the plurality of reference rollers include a first reference roller and a second reference roller, and the first reference roller and the second reference roller are arranged at positions where the first reference roller and the second reference roller are separated from each other in the width direction and are provided between the first pressing roller and the second pressing roller.

9. The food material processing mechanism as defined in claim 8, wherein the plurality of pressing rollers includes a third pressing roller arranged between the first reference roller and the second reference roller in the width direction.

10. A food manufacturing system comprising:
a food material processing mechanism defined in claim 1; and
a bending mechanism which bends a sheet-shaped flexible food material in which a bending reference portion has been formed by the food material processing mechanism, with reference to the bending reference portion.

* * * * *